(12) United States Patent
Grebenyuk et al.

(10) Patent No.: US 7,591,933 B2
(45) Date of Patent: Sep. 22, 2009

(54) SPIRAL ELECTRODEIONIZATION DEVICE WITH SEGREGATED IONIC FLOWS

(75) Inventors: Vladimir Grebenyuk, Woburn, MA (US); Oleg Grebenyuk, Ashland, MA (US); Keith J. Sims, Wayland, MA (US); William W. Carson, Hopkington, MA (US); Russell J. MacDonald, Wilmington, MA (US); Li Zhang, Belmont, MA (US)

(73) Assignee: GE Ionics, Inc., Watertown, MA (US)

( * ) Notice: Subject to any disclaimer, the term of this patent is extended or adjusted under 35 U.S.C. 154(b) by 398 days.

(21) Appl. No.: 11/291,526

(22) Filed: Dec. 1, 2005

(65) Prior Publication Data

US 2006/0169580 A1    Aug. 3, 2006

(51) Int. Cl.
*C25B 9/00* (2006.01)
*C02F 1/00* (2006.01)
(52) U.S. Cl. .................................. 204/260; 204/600
(58) Field of Classification Search ............. 204/260, 204/600
See application file for complete search history.

(56) References Cited

U.S. PATENT DOCUMENTS

| 2,741,591 | A |  | 4/1956 | Dewey, II et al. |
|---|---|---|---|---|
| 3,891,532 | A |  | 6/1975 | Jensen et al. |
| 4,227,986 | A |  | 10/1980 | Loqvist et al. |
| 4,293,400 | A |  | 10/1981 | Liggett |
| 4,872,959 | A |  | 10/1989 | Herbst et al. |
| 4,931,160 | A | * | 6/1990 | Giuffrida .................. 204/632 |
| 5,376,253 | A |  | 12/1994 | Rychen et al. |
| 5,378,339 | A |  | 1/1995 | Aoki et al. |
| 6,149,788 | A | * | 11/2000 | Tessier et al. ............. 204/524 |
| 6,190,528 | B1 |  | 2/2001 | Li et al. |

FOREIGN PATENT DOCUMENTS

| WO | WO-0214224 A1 | 2/2002 |
|---|---|---|
| WO | WO-03043721 | 5/2003 |

OTHER PUBLICATIONS

"Chinese Application Serial No. 200480038231.6, First Office Action mailed Apr. 17, 2009", 9 pgs.

* cited by examiner

*Primary Examiner*—Harry Wilkins
*Assistant Examiner*—Zulmariam Mendez
(74) *Attorney, Agent, or Firm*—Schwegman, Lundberg & Woessner, P.A.

(57) ABSTRACT

Some embodiments of the invention relate to an electrodeionization device that includes comprising a generally cylindrical housing. The cylindrical housing includes a cylindrical inner core and an inner electrode that extends around the inner core. The cylindrical housing includes a leaf arranged as a spiral winding about the inner electrode and an outer electrode that extends about the spiral winding. Active treatment cells are defined by spaces within the spiral winding and by interleaf spaces thereof. One or more sealing bands extend between membranes of the spiral winding to define fluid flow.

8 Claims, 10 Drawing Sheets

FIG. 1D BRINE CELL (IN/OUT-LET PIPING)

SPIRAL ELECTRODEIONIZATION DEVICE WITH SEGREGATED IONIC FLOWS

REFERENCE TO RELATED APPLICATIONS

This application claims the benefit of earlier-filed PCT International Application US2004/034909 filed Oct. 20, 2004, which claimed priority of U.S. Provisional Application Ser. No. 60/512,661 filed Oct. 20, 2003.

BACKGROUND

The present invention relates to methods and devices for demineralizing fluids, and relates to filtration or treatment cartridges or modules, having a generally cylindrical aspect and constructed with plies of spirally wound selectively-permeable membranes. It particularly relates to electrodialysis and electrodeionization devices, wherein the membranes possess ionic selectivity, and the device includes electrodes for inducing transport of species across the membranes by ionic conduction.

In general, electrodialysis (ED) and so-called electrodeionization (EDI) devices operate by providing a structure that arranges flow channels such that a flow of a feed fluid that is to be treated is channeled between two ion exchange membranes of opposite exchange type, while an electrical potential is applied across the membranes transverse to the flow to maintain an ionic current that demineralizes the feed fluid, moving ionizable species from the feed fluid in one channel, through the membranes, and into adjacent channels, thereby producing a demineralized product flow from the feed. Spacers position successive membranes apart to define the fluid treatment channels or "dilute" flow spaces.

A subclass of electrodialysis (ED) devices, often referred to as electrodeionization (EDI) devices, further include a packing of ion exchange material, typically beads or felt, as a flow-pemeable packing within the flow treatment channels and, in certain constructions, within the adjacent mineral-receiving channels. The presence of exchange material in the treatment channels or cells enhances the active fluid interaction area and the capture of ions from the feed, and provides a stationary transfer medium of good electrical and ionic conductivity for transporting the captured ions to and across the surrounding membranes. This construction offers a robust and efficient mechanism for effectively separating many dissolved materials from the flow along a relatively short flow path. The ion exchange material is continuously maintained in an at least partially regenerated (active) state by water splitting.

Over many years, developers of these units have explored the suitability and operating characteristics of ED and EDI devices with a range of flow channel geometries and flow velocities, various membranes defining cells of different fixed or even progressive thickness, and a variety of ion exchange fillings distributed in various localized patterns (such as stripes, bands, special monotype or mixed beds) and other variations. For certain applications, the use of beads with special sorption, catalytic or other properties has been described to stabilize operating characteristics or effect other aspects of treatment.

In these devices, the feed fluid flows one or more times through "dilute" spaces or cells, giving up its ions, to emerge as a substantially demineralized or treated product flow, while a separate fluid in adjacent "concentrate" or "brine" cells receives the minerals stripped from the feed by ionic conduction through the membranes, together with such non-ionic small molecules as may pass through the membranes. Various physical implementations of ED and EDI units are known. The majority of commercial devices, particularly EDI devices, have historically employed an architecture based on flat plate "stacks"—arrangements of many cells formed by stacking substantially oblong membranes, spacers, and screens—collectively forming many cells—between endplates, with electrodes and usually ports or manifolds positioned at the ends of the stack. Similar stacks of disk-shaped cells are historically known. In addition to these "stack" constructions, many publications also describe, and several companies have commercially marketed, cylindrically-shaped ED or EDI devices having cells formed between ion exchange membranes that are spirally-wound about a pipe or core. These devices have electrodes at radially inner and outer positions to apply a substantially radial electrical field between the core and the outer shell of the cylindrical device.

ED (unfilled) devices have found use in treating a number of food industry fluids. A rolled spiral construction similar to the spiral ED or EDI units has also long been used in fabricating cross-flow reverse osmosis (RO), microfiltration (MF) and other types of filtration/separation modules for use with feed streams of alimentary fluids or fermentation product streams, so the spiral architecture is well accepted in that industry for its flow dynamic characteristics, plumbing requirements, ability to handle elevated pressure and other desirable properties. These other spiral-wound filtration devices typically rely upon elevated pressure to drive the filtration process or product through a membrane, rather than upon an electric potential to transport ionizable components across a membrane. Such spiral filter constructions typically permit only small deflections, and are able to sustain high pressures without rupturing membranes. Applicant believes that a spiral EDI construction may potentially enjoy a pressure resistant construction that would desirably permit enhanced throughput, longer, more effective treatment path length or other improved property.

Among the published or commercially promoted spiral ED and EDI products, early examples of Ionics, Incorporated, as shown in U.S. Pat. No. 2,741,591, describe various directions for the respective dilute and concentrate flows, both in relation to the inner and outer electrode and with respect to each other. The Christ, A.G. company of Switzerland has more recently marketed spiral EDI devices, of which examples are shown in their U.S. Pat. No. 5,376,253, entitled Apparatus for the Continuous Electrochemical Desalination of Aqueous Solutions, naming inventors Rychem et al. The construction shown in that patent is a spiral wound EDI with inner and outer electrodes, having its fluid treatment dilute cells sealed to the wall of, and opening into, the inner electrode (which also serves as a central flow pipe), and having its concentrate cells open to the surrounding cylindrical wall that forms a counter-electrode.

Another commercial EDI unit of spiral architecture, originally developed in China, employs mesh-filled wound concentrate envelope and provides an axially oriented dilute flow between the windings. This device is marketed in the United States by Omexell, Inc. of Houston, Tex. The Omexell device is illustrated in U.S. Pat. No. 6,190,528, naming inventors Xiang Li and Gou-Lin Luo. In that construction, a central pipe is both an electrode and a water distributor, while wound metal strip or wire forms the outer electrode. Two membranes surrounding a mesh web form an envelope without any exchange bead filling, and the envelope is spirally-wound about the central pipe to form the concentrate flow space(s) of the device. The alternate regions between successive turns of the envelope are filled with ion exchange resin beads to constitute the dilute channels. The input feed flow and the treated product output proceed through the exchange bead-filled space along an axial direction, from one end of the cylinder to the other, while the concentrate flows from the product feed inlet (embodiment #2, shown in FIG. 4 of the aforesaid '528 patent) or from a slot along half the central electrode/pipe (embodiment #1, shown in FIGS. 1-3 of that patent), along a helical path through the wound concentrate envelope and into (or back into) the central electrode/pipe. Thus, the Omexell construction winds a membrane/spacer/membrane concentrate envelope, and fills the space between windings with resin to form the dilute passages. The resin filling is stated to be replaceable.

Some spiral EDI devices may employ a central pipe as an electrode that doubles as a fluid manifold. Early flat plate EDI stacks were arranged with their dilute and concentrate flows in parallel planes but at a right angle to each other, or at a meandering angle with respect to each other, while many modern flat plate rectangular or oblong EDI stacks are now configured so that dilute and concentrate flows are arranged in closely-spaced parallel sheets in either a co-current or counter-current arrangement. Spiral EDI devices tend to arrange a major portion of the two flow paths cross-current, with one flow being axial and the other locally across the axis along a globally helical path following the spiral contour of the membrane envelopes that define the dilute and/or brine cells. The spiral architecture permits one to define different relative path lengths and flow rates of the two fluids (for example, the axial path may be shorter than the spiral path), and may allow some flexibility or advantages in other respects, such as ease of re-filling or refurbishment, over clamped-plate stack designs.

The Omexell spiral EDI construction is advertised as being readily serviceable, and the '528 patent mentions replacing the dilute cell exchange beads every day by opening the ends of the cylinder, blowing out the exchange beads, and re-filling. That Company has filed a number of This accessibility of the beads in the construction of the '528 patent has been advertised to promote the product by contrasting it to the situation applying to conventional stacks of rectangular construction mentioned above, in which the separate replacement of the exchange beads is generally either quite cumbersome (for example, requiring disassembly and re-assembly of the stack, or requiring a complex emptying and filling regimen), or else is not feasible (because the dilute cells are each formed as discrete permanently sealed envelope-cells that cannot be opened). However, it is not entirely clear from the '528 patent or from the commercial product description why bead replacement is deemed necessary. It is possible that the patent, being a short technical description drafted by a third party at an early stage of development, contains an erroneous description. It is also possible that the common practice in China of relying upon ion exchange beds for primary water treatment influenced the inventors to emphasize, in the '528 patent, the replaceability of exchange beads, so that the new EDI technology would be seen not as an unproven and different technology, but as simply an augmented form of the accepted and proven treatment involving periodic renewal of an ion exchange bed. It is also possible, however, that the device described in the '528 patent was prone to scaling as a result of the minerals (such as calcium and silica) present in the local waters and the nature of fluid flows and electrical fields within the device, and that resin replacement was necessary in that particular context.

EDI units were first developed forty or fifty years ago. At a historically early period of this development, the bead filling was often more or less readily accessible, and one could replace or regenerate the beads separately at frequent intervals to achieve a desired degree of treatment. This allowed the treatment regimen to rely in part on the bead storage capacity (like that of a conventional ion exchange bed) to accommodate part of the removal burden or to effectively remove certain ones of the less mobile ions. Generally, however, modern stacks and EDI devices are designed to operate without disassembly or resin replacement for extended times—a period up to several years. During operation, a portion of the exchange bead filling is continuously electrically regenerated, and the devices are operated in a steady state. While certain feed water quality standards may be specified to assure long term stability, occasional total regeneration and/or cleaning or reversal cycles my be performed to address scale-like build-up or performance deterioration, and to prevent any fouling or scaling from irreversibly impairing operation.

Without dwelling further on generalities or specific constructions, it may be said that EDI constructions of both the stack and the spiral architectures rely on the capture of ions by exchange beads and the transport of captured ions through a chain of one or more beads either to, or closer to, the exchange membranes that actually transfer the ions out of and separate the ions from the feed flow/dilute path. The exchange beads are continuously regenerated (for example, by hydronium or hydroxide ions that are created by water splitting at places of high field intensity, such as heterogeneous bead/bead or bead/membrane junctions), and the devices are generally set up to operate in a steady state on a given feed for extended periods of time. However, the rate or flow distribution and other factors governing all these effects are such that conditions of high concentration of specific ions, extreme pH, or flow stagnation may all arise in use, and certain combinations of these conditions may pose control problems, impair the efficiency or degree of treatment, or risk introducing irreversible membrane damage and/or localized occurrences of resin or membrane scaling within the device. The dimensions and geometry of the flow cells, the nature of the exchange filling formulations, and details of the hydraulic plumbing may all be important in addressing such problems, and a certain amount of pretreatment of the feed fluid is also generally required to assure a suitable initial feed quality that will not give rise to problems over the long term. Extensive industrial operating experience further allows one to specify operating parameters and protocols to follow for each device with various feeds in order to safely avoid, address or minimize long term performance deterioration.

One aspect of EDI device construction deserves special mention, namely that the membranes as well as the exchange beads employed in these devices are swellable, and generally undergo changes in dimension between their dry and hydrated forms. Some heterogeneous exchange membranes may swell by twenty percent, and wetted beds of exchange beads also increase their volume and may exert high pressure if unduly confined. Such swelling may impair the flow impedance, or may affect the integrity of membranes or structural elements. This has lead various manufacturers of EDI stacks to propose assembly steps such as pre-soaking membranes for lengthy periods before assembly; using more rigid intermediate frame or spacer assemblies having multiple lands, bosses, beads and/or registration pins to secure the membranes, confine the exchange beads and maintain alignment and sealing; filling of beads by precisely-measured quantities in a dry or salted form to achieve precisely quantified swelling, or filling as pre-formed blocks or gels of exchange media; or dynamic filling of cells by a fluidized and possibly salted slurry, to assure a desired cell packing.

For spiral constructions, the dimensional instability of membrane and bead media, together with the local slippage introduced by winding at different radii, and the relatively large length of individual membranes, raise additional potential problems of membrane spacing or support, stress, shrinking or buckling, and cracking. A number of investigators have proposed the use of fixed and pre-formed spacing elements such as bumps, posts or ribs rather than beads, either as separate elements, or as features formed on the membrane surface, to avoid irregular spacing or undue mechanical stresses and to maintain a desired membrane-to-membrane spacing.

Within this general picture, various problems or perceived problems or design constraints may arise. For example, in the 1960's it had been shown that certain properties of EDI operation are optimized with uniform sized ion exchange beads, and with thin filled cells; in the commercial field, some industry advocates have long urged that a cell thickness defined by a low number of exchange beads (e.g., 4-10 beads) is optimal. Thick cells have also been advocated for specific purposes, such as high silica removal achieved by inducing an upward pH shift due delayed hydroxyl removal under polarized operation. It is apparent that a small cell thickness introduces hydraulic flow limitations that will vary greatly as a function of exchange bead size and feed fluid viscosity; theoretical or empirical modeling done with water would not necessarily apply to systems for treating common alimentary fluids. Moreover, with any feed, local current density may vary within the many cells of a conventional EDI stack or device, and is substantially affected by local variations in distribution of exchange beads, as well as by channeling or local variations in flow that may occur. These current variations and resulting potentials may profoundly alter the intended operating performance. In addition, in spiral devices, current density increases inversely with radial position, raising further control or operational difficulties. Moreover, fluids such as alimentary or fermentation fluids are notoriously prone to fouling—both functional fouling of exchange bead surfaces and functionality, and physical blockage of flow through the exchange beds. Fluidized exchange beds have been employed to address the latter problem, but this approach cannot be employed with the exchange bead filling of EDI devices, because it is inconsistent with the requirement of direct contact between exchange beads and the constricted space existing between the exchange membranes.

For such reasons, the fabrication and operation of EDI demineralization devices remain rather complex and costly, and each particular construction may have its own limitations or drawbacks.

There is thus a need for new constructions of such devices, for devices that offer improved cost or ease of manufacture, and for EDI devices that provide different or improved operating abilities.

SUMMARY OF INVENTION

One or more of these and other desirable features are achieved in accordance with the present invention by an apparatus for demineralizing a fluid flow. The apparatus includes two conductive electrodes, and one or more windings, each winding comprising at least a pair of selectively permeable membranes, generally a cation exchange membrane and an anion exchange membrane, together with a spacing element. The cation and anion exchange membranes are arranged parallel to each other, and the spacing element maintains a separation or gap that allows liquid to flow in the space between membranes. In accordance with one aspect of the invention, the assembly of membranes and spacer (herein called a "leaf") or several such leaves, are spirally-wound around a central cylindrical core formed of electrically non-conducting material, while maintaining a space, for example by means of a further spacer, between successive leafs, or between the successive windings of a single leaf. The assembled device comprises two types of cell or chambers which are adjacent to each other in alternation, and the cells are defined by the spacing elements and the further spacers, forming flow chambers, i.e., dilute and concentrate chambers within the device. In a preferred embodiment both the dilute and the concentrate chambers each include ion exchange material. In accordance with another aspect of the device, the spacers are sheets that may be handled, rolled and manipulated during assembly of the device.

The spacing element between membranes, as well as the further spacer, can be formed of inert polymer material, ion exchange beads, ion exchange fibers, a combination of two or more these elements, or a porous medium (such as a sponge, felt or sheet) incorporating one or more of such elements as an intrinsic part.

In accordance with another aspect of the invention, the apparatus is assembled in a housing having a cylindrical shape, and includes two radially spaced apart metal or conductive components which act as electrodes. At least one of these conductive components is placed at a radially inner position surrounding the central core and the other of the conductive components is placed at a radially outer position near the perimeter, thus establishing a generally radially-oriented electrical or ionic current between the inner and the outer electrode, across the helically disposed flow spaces defined within and between the membrane/spacer windings of a rolled leaf assembly. One or preferably each of the electrodes may be formed as a sheet metal spiral, with a radially-extending opening that receives the end of a leaf, and positions the active flow cells of the device in a uniform electric field free of shadowing and hot spots. The opening forms a sealed and isoelectric cage about the end of the cell-defining layers.

A preferred electrode is formed as a conductive sheet wound in a volute circumscribing more than one full turn, with an axially-extending strip-like gap or opening defined in an overlap region between the radially inner and the radially outer edges of the volute. The opening accommodates passage of the end of a leaf along a tangential path parallel to the electrode surface into a sealed pocket of the electrode (e.g., between the inner surface and the edge of the outer surface of the volute), while fluid communication with the inter-membrane flow space and connection to a fluid port or manifold may be effected through the electrode. The leaf entering or exiting the electrode pocket approaches at a tangential angle, and may therefore wrap closely parallel to the electrode surface, providing an exceptionally uniform current distribution around the electrode, free of the shadowing and inhomogeneities that occur with prior art constructions that employ clamping, membrane doubling or other irregular fixing or termination structures at the electrode. The construction also avoids introducing brine manifold shorting or back diffusion that may, to some extent, plague prior art constructions. A membrane may also be sealed or attached to the electrode in the overlap region, simplifying fabrication of the spiral-rolled cell structure.

While it is preferred that the electrodes be formed of continuous metal sheet in this aspect of the invention, in other embodiments the electrode may have openings and may take the form, e.g., of a metal screen, or of multiple discrete but electrically interconnected segments that are arranged to form a generally equipotential surface contour. For example, discrete elements may be shingled or arranged adjacent each other to form a cylinder (of substantially constant radius), open volute (of somewhat increasing radius) or similar shape that defines a complete circumferential turn of equipotential surface.

In EDI devices of the present invention, the leaf (or leaves) are wound such that, as viewed in cross-section, dilute and concentrate spaces alternate adjacent each other along the radial direction, and preferably the envelope forms the concentrate channel. Preferably the feed flow of liquid to be treated enters the apparatus (e.g., enters the dilute cells) at one end of the device between the inner and outer core, and passes along a treatment path parallel to the axis of the device through the dilute cells between membranes, while an ion-receiving concentrate flow is maintained in a corresponding concentrate cells defined on the other side of each membrane, within the helical inter-membrane spaces described above.

Flow paths taken by flows within the helical cells are defined by one or more seals that extend between pairs of adjacent membranes, and which may constitute edge seals, blocking or channeling barriers, or a path-lengthening maze to direct the flow. Other seals on one or more membranes may define a dry or inert region of the spiral in a position effective to prevent the feed and concentrate flows from mixing, for example, at the ends of a leaf.

In accordance with embodiments of this aspect of the invention, seals along or between portions of the flow path may define a multi-stage device, may define separate feed and/or concentrate flows for different stages, may define relative flow rates of the concentrate and/or dilute fluids, and/or may operate to define functional sub-regions of the treatment path. The seals may also direct the feed and concentrate flows along preferred directions or along preferred relative orientations, or may direct the concentrate to maintain separate flows of different groups of removed species in one or more portions of the paths so defined. The relative orientation of feed and concentrate flow on opposite sides of a membrane may, for example, be different at different positions along the flow path, based on a considerations such as the prevailing ionic species and their concentrations, the electrical resistance, the polarization state and/or pH in that region, the type of ions (such as scale-forming, monovalent, divalent or specific ions) transported in that or upstream flow regions, and the mineral or gas burden, of the dilute, the concentrate, or both flows. In some embodiments, the seals may operate to form internal distribution manifolds, for example directing a portion of the feed or partially treated feed into the concentrate path; or may operate as pressure regulators to adjust the pressure in a cell relative to adjacent cells in order to assure proper flow or to resist pinching of cell walls.

Flow may also be segregated on the concentrate side by oriented strands of a mesh spacer, or by bands of impermeable material placed on the spacer in an oriented pattern. In one preferred embodiment of this aspect of the invention, the dilute flow follows a path parallel to the axis of the cylindrical winding, and the concentrate flow is directed such that it remains in or flows parallel to a plane perpendicular to the axis. Thus, as bivalent metals such as calcium, followed by ions such as sulfate or carbonate, are successively removed from the axial dilute flow and enter the concentrate cells, each of the removed impurities remains in a band within the cell as it flows toward the cell outlet, and does not mix with the other removed species. The segregated flow effectively prevents scale from forming. In another or further embodiment of this aspect of the invention, the dilute cells may have a banded filling wherein the resin in a band at a stage along the feed-product flow path is of a type selected to enhance removal of the species (for example, of, to capture scale forming metallic ions) in that stage, or to selectively block capture or transmembrane passage of a species (for example, sulfate or carbonate) until a later position where it may encounter a resin selected to promote capture. Such banded resin filling thus sharpens the separation of the different potentially scale-forming species that may be present in the feed.

In accordance with another aspect of the invention, structures normalize current density to promote uniform and effective demineralization. A distribution of dilute inlet and/or outlet passages may define a radially varying flow distribution tailored to the prevailing electrical current density.

BRIEF DESCRIPTION OF THE DRAWINGS

The invention will be understood by those skilled in the art from the description herein of several embodiments and illustrative details of construction, and some of its desirable variations and features, together with figures thereof, wherein

FIG. 1D illustrates a manifold construction useful in the cells of FIGS. 1A-1C;

DETAILED DESCRIPTION

Figure 1:
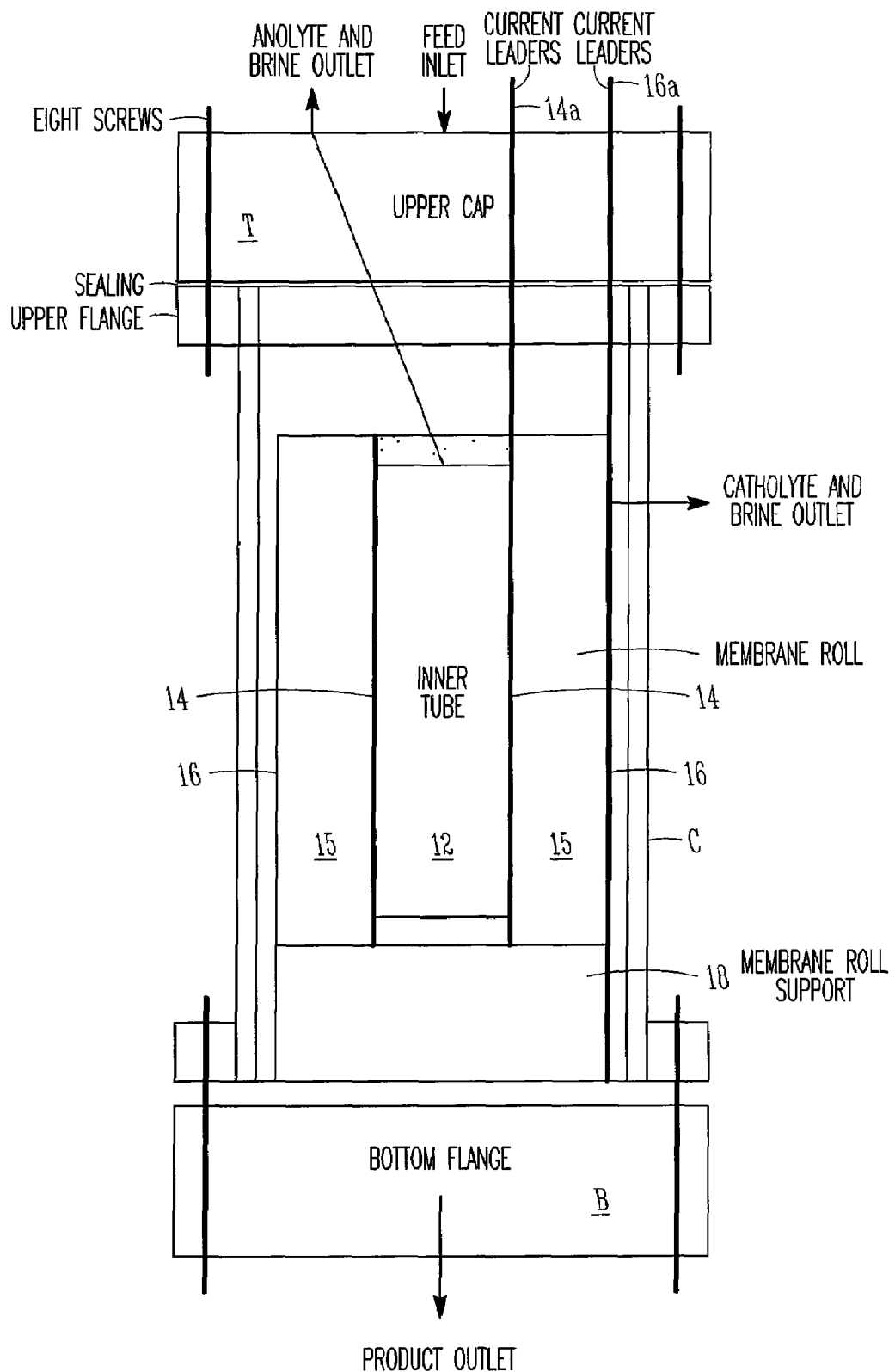
FIG. 1 is a schematic plan view of a first embodiment of a cylindrically-shaped spiral EDI apparatus in accordance with the present invention, illustrating one layout of representative components.

FIG. 1 is a schematic plan view of a first embodiment 10 of a cylindrical EDI apparatus in accordance with the present invention, showing general layout of components. The EDI apparatus 10 includes a housing illustratively comprised of a bottom flange plate B, a top flange plate T and a cylindrical body C that together define a generally cylindrical vessel or fluid-confining enclosing chamber. A membrane roll 15, of which several examples are described below, is wound around a central core 12 within the housing. Illustratively, a membrane roll support 18, the structure of which may take various forms, supports the membrane roll. An inner electrode 14 surrounds the central core 12, and is coupled to a first current leader 14a for connection to an external power source, and an outer electrode 16, coupled to a second current leader 16a, substantially surrounds the membrane roll 15. The membrane roll is wound in a spiral in the annular space between the two electrodes 14, 16. Within various constraints discussed below, one or both of these electrodes may be a continuous sheet, may be perforated, may be a mesh or screen-like sheet, or may be formed of interconnected discrete electrically conductive elements which generally span a contour surrounding the center or the periphery, respectively. The electrode, whether screen-like, perforated, or continuous has its conductive surface sufficiently extensive to provide what is substantially an equipotential surface around the inside axis (respectively, outside periphery) of the membrane roll. Preferably, as described further below in connection with FIGS. 2A and 2B, at least one and preferably both of the electrodes are continuous sheet electrode that span more than one full turn to define a pocket or opening to receive the end of the membrane roll tangentially into the electrode.

This overall geometry positions the flow spaces defined between a pair membranes generally traverse to the (radial) direction of current paths which extend between the inner and outer electrodes 14, 16. The electrode opening allows an inter-membrane flow space to terminate in an inert or field-free region, while avoiding the localized regions of shadowing and field inhomogeneity previously caused by clamping, blocking or doubled membranes, and sealing structures of the prior art. The electrode pocket construction also allows a dilute chamber sealing that isolates the treated stream from excessive electrolyte concentrations near the electrodes. No separate electrolyte chambers or streams are needed.

The central core 12, which may be substantially contiguous to the inner electrode, is preferably a non-conductive structural element such as a polymer pipe, or if conductive is not energized to define a driving field. It may be sized so that the inner electrode sits directly against its outer surface, thus serving as a structural or supporting member, and it may include appropriate apertures to serve as the fluid inlet or outlet for portions of the device. In accordance with one important aspect of the present invention, the inner electrode may have a diameter or cross-dimension that is a substantial fraction of the diameter of the outer electrode, so that the active windings of the membrane roll are positioned in a relatively narrow cylindrical annulus between the inner and the outer electrodes which experiences a fairly uniform field. This annular region has a radial extent less than, e.g., half the diameter of the outer electrode, preferably under about thirty percent, and most preferably under about twenty percent. The relatively similar magnitude of the radii of the two electrodes enhances electrical operation by keeping the distribution of current density fairly uniform: the current density near the inner turns of the membrane roll remains relatively limited. For example, other things being equal, the relative current densities would vary inversely with the relative areas, hence radii, of the electrodes. Setting the inner electrode diameter close to the outer electrode diameter may be done such that the ratio of inner and outer electrode areas, hence the nominal relative current densities at the outer and inner electrode surfaces, may be under 1:2, under 1:(1.5) or even below about 1:(1.2). While not explicitly shown, various fittings, passages, ports and conduits may pass through the housing and/or the support 18 to introduce, distribute, collect or deliver the feed stream, treated product and concentrate flows. Some example will be discussed below with regard to particular constructions.

The membrane roll 15 includes one or more "leafs", each leaf being rolled or spirally-wound about the inner electrode and central core. A leaf includes two selectively ion permeable membranes, and these are arranged so that the membrane roll defines adjacent or parallel sets of dilute (feed) and concentrate (brine) flow paths positioned in the annular space between electrodes. In accordance with a principal feature of one aspect of the present invention, the dilute and brine cells are constituted by spacers having flow paths defined by various flow-blocking or flow-directing seals between adjacent membrane surfaces of a leaf. In some cases, flow-enhancing spacer regions are also positioned to achieve a desired pattern of flow direction and magnitude within the housing. The geometry and pattern of the flow paths may be configured in several ways according to the invention so as to enhance flow treatment characteristics, such as increasing ion removal, decreasing back-diffusion, scaling or other undesired effect, or enhancing or controlling other characteristics of operation. These features will be understood from the following specific examples.

Figure 1A:
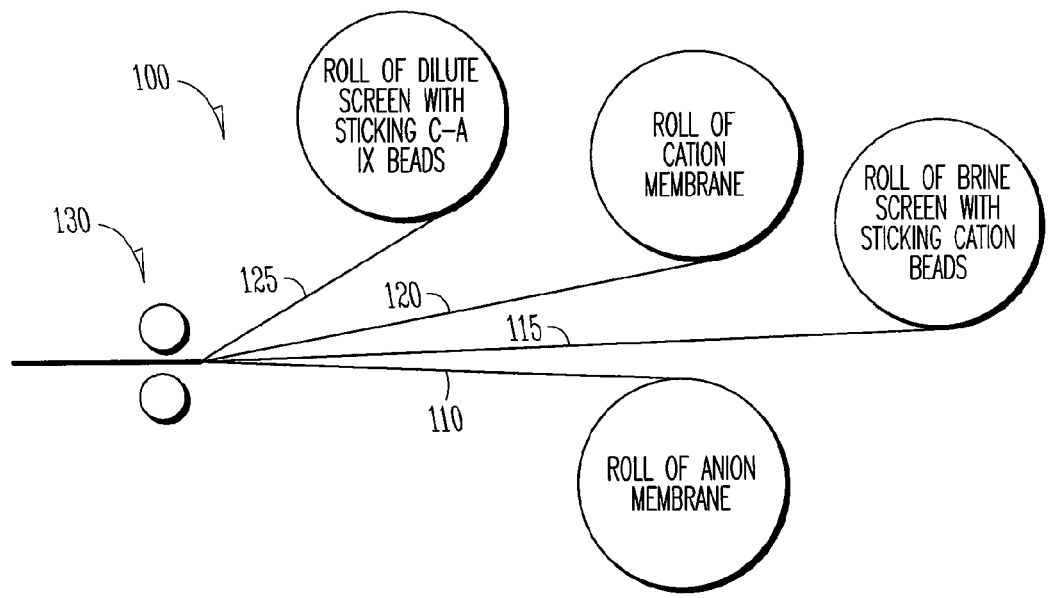
FIG. 1A illustrates a method according to one aspect of the invention for forming cells of the EDI apparatus of FIG. 1.

FIG. 1A schematically illustrates a method of manufacture in accordance with one aspect of the present invention. As shown, a membrane roll 100 (see, e.g., membrane 15 in FIG. 1) is formed of a single continuous leaf 130 using a continuous sheet of anion exchange membrane 110, a brine cell spacer 115, a continuous sheet of cation exchange membrane 120 and a dilute cell spacer 125. The brine cell spacer 115 may consist of one or more plies of a flexible non-woven screen mesh, such as a ten to seventy mil thick polyethylene or other fluid-compatible material of suitable thickness and screen size that, after assembly, provides a distributed support between the two membranes adjacent to it while permitting fluid to flow through the layer occupied by the mesh. The spacer in preferred constructions includes other elements in its assembly, particularly conductive and/or ion exchange beads distributed to constitute a suitably fluid-permeable but ionically- or electrically-conductive inter-membrane filling. Preferably, the spacer is a web comprised of one or more mesh sheets having ion exchange beads permanently or temporarily stabilized thereby, interspersed therein, or affixed or adhered thereto. Such a sheet may be handled with ease during assembly of the EDI devices. The body of the screen, e.g., the filaments or crossed filaments, assures a minimum inter-membrane spacing, while the beads provide distributed membrane-contacting support and a certain level of electrical conduction (in the concentrate space) or of ion-capture and ion-conductivity or transport activity (in the dilute space). In a presently preferred embodiment, the concentrate compartment preferably employs only cation exchange beads, while in the dilute compartment a spacer layer having beads of both cation and anion exchange types will generally be desired for capture and removal of all ionizable species. A preferred spacer assembly 115 includes both a screen mesh, and ion exchange beads or conductive media, which together determine the cell thickness, flow impedance and other flow characteristics, and the conductivity and overall efficacy of demineralization. The dilute screen preferably also serves a bead-segregation function, allowing dilute cell fillings in which beads are segregated by type- the anion exchange beads and cation exchange beads are retained in separate physical positions.

A few representative dimensions will be given here simply as an aid to visualization of commercially useful sizes of the spiral EDI devices contemplated by the invention, without, however limiting the invention to such sizes. The axial length of the apparatus may be on the order of about one-quarter to about one meter or longer, while the device may have a diameter of under ten to about sixty centimeters. The spiral flow cells defined by the rolled membrane and spacers may extend up to several meters or longer, and the path of fluid flow within the spiral space or layer of a roll of given diameter may be constrained to an axial or a helical direction or may follow a path comprised of several segments changing in direction or type. The inter-membrane space is well-defined with spacer material comprising one or more screens and a defined exchange bead filling. It is preferred that the filling of ion exchange beads be a relatively spare filling, as described in commonly owned PCT International Application PCT/US03/28815 entitled SPARSE MEDIA EDI APPARATUS AND METHOD, filed in the United States PCT Receiving Office on Sep. 12, 2003. The disclosure of that international application is hereby incorporated by reference herein in its entirety. Briefly, that patent application describes methods of forming ion exchange fillings consisting of a layer of scattered beads, or a relatively complete monolayer, bi-layer or various striped, banded, or otherwise segregated layers of ion exchange beads, in thin EDI cells that operate with enhanced electrical efficiency or control and exhibit low and well controlled flow impedance characteristics. These layers, which preferably include a screen in addition to the exchange beads, promote extremely uniform inter-membrane spacing and support, and in operation they achieve enhanced electrical efficiency and reduced residual contamination. They also operate dependably with long flow paths, allow a greater number of parallel cells in a given radial length of the winding, and present a flow cross-section that remains relatively free of channeling.

Thus, in accordance with one important aspect of the present invention, a spiral EDI device is constructed having cells formed by the interior of one or more thin rollable envelope assemblies that feature both a mesh web and a sparse filling of ion exchange beads. Advantageously, by permanently or temporarily bonding or sticking the beads to the mesh web, a sheet or a continuous web of screen/bead spacer material may be formed, and the leaf structures, e.g., a bead-loaded spacer layer, a spacer/membrane or a membrane/spacer/membrane layer or membrane/spacer/membrane/spacer layer, may then be rolled in a discrete or a continuous operation as shown in FIG. 1A.

When the layer or cell structure employs a sparse filling, a so-called "short diffusion path" or "shallow shell" resin may be used to help control or match the electrical resistances of the resins in constructions wherein two or more resins are placed next to each other in a common electrical field, or to enhance efficiency when resins of different diameters are to be placed together. These beads will also regenerate faster after a clean-in-place procedure or after being assembled in salt form, and are expected to generally operate and regenerate noticeably more efficiently in a sparsely filled EDI device, where they will exhibit very sharply defined bleed-down times after regeneration or reversal.

Various protocols may be employed to attach a scattered or continuous monolayer of beads to the screen (for example, with individual beads held in the openings of a screen having a mesh size roughly equal to the bead diameter), or to attach a substantially full monolayer of beads to each side of the screen (for example by treating the screen with adhesive and then cascading ion exchange beads against each side of the screen to capture and bind the beads.) In each case, the bead/spacer assembly may then be handled and manipulated freely, enabling a bulk or semi-continuous process of rolling and assembly to produce a finished EDI device. When cation and anion exchange beads are placed on opposite sides of the dilute screen, the dilute screen should be oriented in the final assembly to have the cation exchange beads on its side contiguous to the cation exchange membrane, and to have the anion exchange beads on its anion exchange membrane side. Furthermore, when rolled between an inner and an outer electrode, the dilute cell spacers are preferably oriented such that a cation exchange membrane lies on the cathode side of the cell and the anion exchange membrane lies on the anode side of the cell.

Figure 8:
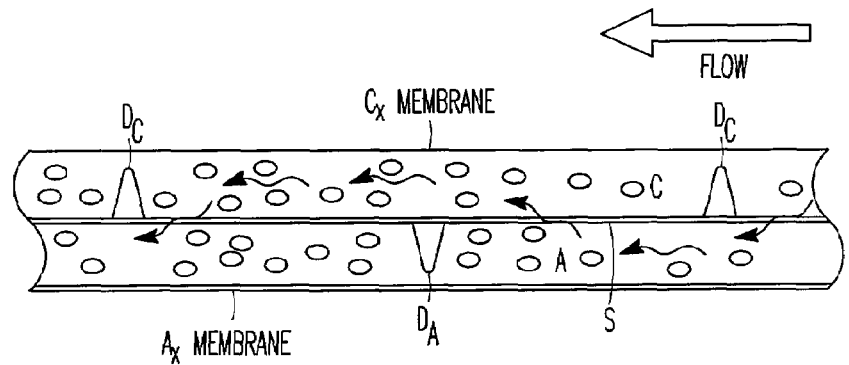
FIG. 8 illustrates a detail of a sparse bilayer screen spacer construction having cross-path deflectors for uniform cell conductivity and enhanced treatment.

In thin spacers cells of the above-described construction, the screen mesh and bead size may be selected such that the screen maintains separation of the bead layers on opposite sides of the mesh, and such that the beads and screen assure an appropriate total inter-membrane spacing, which may be selected in the range of under about one millimeter to at most several millimeters. When beads are attached to respective sides of the mesh in this manner, the mesh size may also be selected such that beads of opposite type contact each other through the mesh openings, without migrating through the openings. In these constructions, it is preferred that during fabrication, the screen be coated with a contact adhesive to capture and hold the respective beads, but that the beads themselves lack adhesive; this assures that the bead surface remains active, and that the bead-to-bead junctions that occur in the completed assembly are direct conductive contacts with no adhesive interlayer or other impairment of electrical or ionic contact. As described in the aforesaid international patent application, these constructions assure a useful level of water splitting, but do not introduce extraneous reverse junctions that would throw salt or cause electrical inefficiency. When different exchange types are segregated on opposite sides of the mesh, certain one-sided barriers or diverters may also be provided along the flow path to further enhance efficiency by causing the dilute stream to meander back and forth across the screen, i.e., from the cation side of the cell to the anion side and back to the cation side so that the fluid passes through both exchange bead layers. This construction which applicant refers to as "s-layering" and which is schematically shown in FIG. 8 below, assuring that the treated fluid contacts both types of exchange bead, offers the performance advantages associated with zebra- or layered-filling, and also avoids the creation of localized regions of irregular conductivity and promotes a more uniform current distribution, because the two types of beads contact each other in series across the cell. Therefore, the same current must pass through both the anion and cation exchange beads, despite their relative capture affinities or ion transport efficiencies and the prevalent ionic burden in the feed fluid. As a result, the removal of anions and cations from the flow therefore each proceed at comparable rates, and the flow is not subjected to irregular patches of species depletion and polarization. Moreover, the lack of "granularity" tends to prevent localized regions of high pH that might otherwise be prone to membrane scaling.

As shown schematically in FIG. 1A, a process 100 for forming the leafs of EDI devices of the present invention involves providing a sheet 110 of anion exchange membrane, placing a sheet 115 comprised of one or more layers of a screen or mesh loaded with exchange beads on or adjacent the sheet 110, and covering the mesh/bead sheet 115 with a sheet of cation exchange membrane 120. The two membranes may be sealed together along one or more edges, as discussed further below, forming an envelope structure about the mesh; this may be done, for example, to form a concentrate cell envelope structure. The envelope is assembled with an additional screen layer 125 having suitable exchange beads, which, for the dilute cell spacer layer, will generally be of both anion and cation exchange type, and the membranes and spacers are then rolled to form a spiral EDI unit. Such process of manufacture is indicated schematically by the arrangement of rollers 130 in FIG. 1A. In practice, the assembly process will employ various guides and brakes to maintain web tension, and particular ones of the layers may terminate or extend beyond others, as discussed below, to effect suitable end geometries and to suitably position electrode, spacer cell or other functional components of the device. Various subsidiary steps or components, such as addition of flow deflectors, spacer shims, and edge gaskets or seals, some of which steps or components are discussed further below, are not specifically shown but these may be effected at appropriate points along the line as the first membrane, spacer or other web passes along the stages for assembly of the spacers and membranes in an envelope/spacer roll. This basic structure is wound and assembled with the electrode and core structures, and mounted within a cylindrical vessel to form the complete EDI device. An electrode may itself constitute a wall of the a vessel, although it is necessary to have at least some portions of the vessel be electrically non-conductive to avoid electrode shorting and/or potential shock hazards. In one prototype embodiment, electrodes are formed of foil, and may be assembled in a process wherein the first and last turns of the membrane/spacer assembly are wound with and conform to the electrodes.

On a global scale, flow paths in the assembled EDI device are implemented with the dilute (feed-product) flow proceeding within the spiral-rolled spacers that constitute the dilute cells and brine cells. In the dilute cell, the flow may preferably be parallel to the longitudinal axis of the device, while in the concentrate or brine cells, flow proceeds along one or more directions, examples of which are illustrated below, within the spiral-rolled envelope(s) that define the cells. Within at least some cells—illustratively the concentrate cells—the flow is confined and its direction further determined by impermeable seals extending between the opposed surfaces of the two membranes on both sides of a spacer. These seals may confine, deflect, orient or concentrate the flow in various ways, discussed further below, and they are preferably implemented by laying down one or more strips of a viscous sealant, adhesive tape or band in desired positions. Seals may be formed, e.g., by applying a liquid formulation via an applicator nozzle as the membrane/spacer/membrane assembly is being laid out, or as it is being rolled if rolling of multiple lamina is performed directly as shown in FIG. 1A. When sealing bands are applied to form dilute cell flow paths, these are preferably applied during the rolling process (FIG. 1A), while the concentrate cell paths may be applied either during a preliminary rectilinear layout operation, or during a roll-forming procedure.

Embodiments of the invention may be implemented with different sealing band patterns to achieve different patterns of desired flow.

Figure 1B:
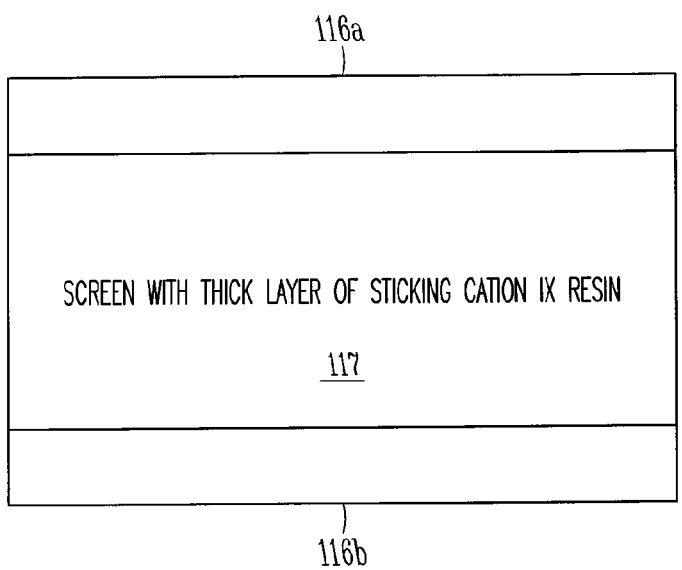
FIG. 1B is a plan view of a first membrane envelope illustrating aspects of sealing in accordance with the present invention for defining cells of an EDI device such as schematically illustrated in FIG. 1.
Figure 1C:
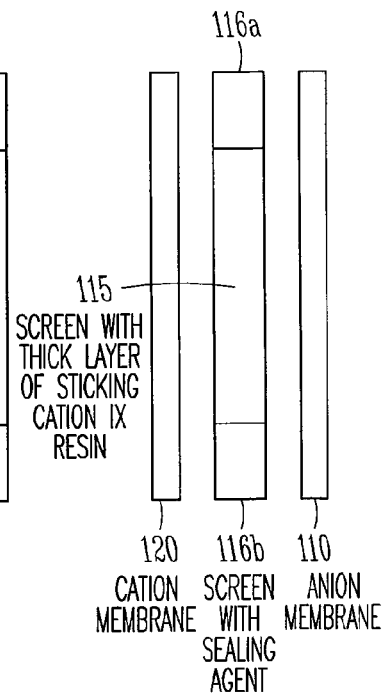
FIG. 1C is a cross sectional view of the cells constructed as in FIGS. 1A and 1B.

FIGS. 1B and 1C illustrate a pattern of brine cell sealing bands for effecting one basic spiral-brine cell construction. In this embodiment, the spacer mesh 115 is impregnated with a suitable sealant along first and second sealing bands 116a, 116b extending along the top and bottom of the spacer (corresponding to upper and lower ends of the device in the orientation shown in FIG. 1), above and below the bead-bearing central region 117 of the spacer between the two opposed membranes 120, 110. This results in an envelope structure wherein the ends of the membrane/spacer/membrane envelope (the left and right ends in FIG. 1B) open to the interior of the envelope for providing and receiving the concentrate flow. The sealant may, for example be a suitable (poly) ethylene vinyl acetate ("EVA" or "PVA") material applied to both sides of (and through) the edge of the screen, which otherwise constitutes a flow-permeable spacer. The sealant may be formed of another suitable material, e.g., a viscous, preferably curable, sealant or a sticky two-sided tape effective to provide an impermeable seal extending for the thickness of the spacer between and bonded to both membranes along the edges of the spacer assembly. In these constructions, the spacer in the region of the sealing bands is preferably, but not necessarily, free of ion exchange beads. When assembled with the membranes 110, 120 in a rolled winding, the spacer then defines a brine flow cell having closed top and bottom wherein the brine flows within, and may follow, the helical winding space of the membrane roll between its inner and outer ends. Advantageously, when the pattern of sealant is applied on the component at the time of assembly, the various membrane and spacer layers may slip to accommodate differential movements as the as the leaf is rolled (with suitable tension on the webs) into a spiral. Such slippage results in a substantially stress-free and buckle-free assembly process; the sealant may further polymerize and cross-link to form a stronger, flexible or inflexible, impermeable barrier between components (e.g., a "form-in-place" gasket). In other embodiments, however, a seal may be achieved by placing flexible liquid-impermeable electrically non-conducting strips between the membranes, for example, by placing gaskets along bands at the edges of the membranes and outside the screen area. EDI devices of the invention may also be constructed that achieve sealing by forming the spacer assembly itself with liquid-impermeable electrically non-conducting rubber or plastic solid (non-mesh) edges that span the gap between the membranes, a construction similar to the one-piece "screen spacers" commonly used in brine cells of most commercial flat plate type EDI stacks which have a strip gasket formed by co-moulding around their periphery. However, in this case the modulus, finish and dimensional tolerances of the edge region gasket material must be appropriately set to assure that the spacer edges will seal effectively against the surface of the adjacent membranes. It may further be advisable to employ liquid sealant or gasket cement on the relevant membrane-contacting surfaces of the solid periphery. However, use of a viscous sealant applied through the spacer mesh, possibly with additional lamina of mesh to provide a cell thickness identical to the mesh-plus-bead spacer of the center, is preferred for its ease of implementation. In each case, the sealant, cement or gasket material is preferably of a composition selected to be non-leaching so that it does not bleed solvent or polymer into the stream, and is of a composition proven to tolerate the EDI conditions and the treatment or conditioning chemicals that may be present in the process flow. Sealants compounded with a filler material (such as titanium dioxide or other inorganic powder) are similarly to be avoided. When the leaf structure or roll assembly is to be assembled wet (including soaked with a non-aqueous solvent), it is preferred that the sealant or adhesive be compatible with such assembly, and when the assembly is to be sealed before rolling, the sealant should be flexible, or non-hardening at least during the assembly process. It is also desirable that the curing or drying of sealant not introduce such stiffness or dimensional changes as might introduce mechanical stresses in the adjacent membrane, or cause cracking.

Applicant has found a wide variety of adhesives to be serviceable. These include a two-part epoxy sealant for wet surfaces made by the Hardman Company; a one part marine adhesive sealant marketed by the 3M Company; DAP two-part resorcinal glue; DAP liquid neoprene rubber cement; a two-part polyurethane sealant of H. B. Fuller Company; Wellbond™ sealant; and a one-part water-cured polyurethane sealer 4R-0215MF of H. B. Fuller Company.

FIG. 1C shows a cross sectional view of the spacer 115 of FIG. 1B assembled between two membranes 110, 120 as in FIG. 1. The cation exchange membrane 120 lies on one side of the spacer, and the anion exchange membrane 110 lies on the opposite side, with the seals 116a, 116b forming impermeable barriers at the top and bottom edges of the membranes. When rolled in the housing, the brine cells thus constitute the helically disposed space between the two sealing bands. Fluid may be introduced and removed at the inner and outer ends of the winding.

FIG. 1D illustrates a useful construction for applying or removing fluid from the concentrate cells formed in the membrane roll. In accordance with this embodiment, the spacer element 115 comprises a screen, or several plies of screen, together with some exchange beads that maintain a desired minimum level or threshold value of electrical conductivity (not specifically shown), and as discussed above, and which generally maintains separation between membranes 110, 120 and assures distributed support against pinching off of the inter-membrane flow space. A band or region of the spacer, which may be one of the bands 116a, 116b or may be a band placed elsewhere, such as at an end of the spiral, is closed by a further seal 119, and a portion of the screen adjacent the end remains free of such beads, thus offering a more open flow path and decreased flow resistance. This open or unfilled spacer, if positioned near the inlet of the flow may advantageously serve as a flow-distributing region to efficiently allocate flow across the width of the spacer into the adjacent region of bead loaded mesh; alternatively, when positioned distal to the inlet, it may operate as a flow-collecting outlet region to efficiently receive the outflow from across the bead loaded spacer mesh and conduct the combined outflow. It thus presents a low pressure drop (at the inlet end for distribution) or a high pressure drop relative to the filled-path impedance (at the outlet end) and low impedance outlet conduit that serves to define the general direction of flow within the cell from a supply inlet to an outlet.

A separate inlet/outlet conduit 128, such as a perforated tube, may optionally be placed in this area, to deliver to or collect fluid present in the low impedance unfilled screen, and in that case the inlet (respectively, outlet) tube may pass through one of the seals 116a, 116b, 119 or other structure to connect with a vessel inlet or outlet port of the assembled device. Such port may be internal (when, for example the brine is fed by a bleed from the feed in, from the dilute mid-path, or from the dilute product out flows), or may be external as may be desired when the brine is to be fed via outside piping, or is to be actively recirculated or have its pressure or flow set via an external valve or regulator. In general, it is expected that with the flow cells defined by an open mesh and the presence or absence of a relatively spare filling of exchange material, the leaf or leafs of the spiral EDI devices may be arranged to passively provide effective dilute and concentrate flows by use of suitable seals, path lengths and intercommunicating path openings, without reliance upon circulation pumps or complex flow control systems.

The concentrate cell screen may have conductivity-enhancing material, such as conductive metal, polymer or carbon beads temporarily or permanently fixed thereto or captured therein, to augment its structural support and/or electrical conduction properties, either instead of or in addition to cation exchange material. The inlet or outlet pipe, if provided to apply or conduct away fluid from the inter-membrane space, may be formed by a perforated stainless steel tube or other suitable conduit/distributor structure extending into the open (unfilled) mesh or extending along the sealed edge.

Figure 2A:
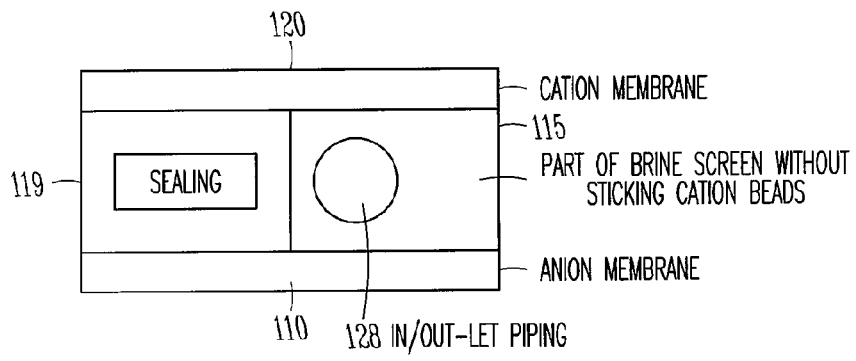
FIG. 2A is a plan view of a second membrane envelope and associated components for a spiral EDI device as illustrated in FIG. 1.
Figure 2A:
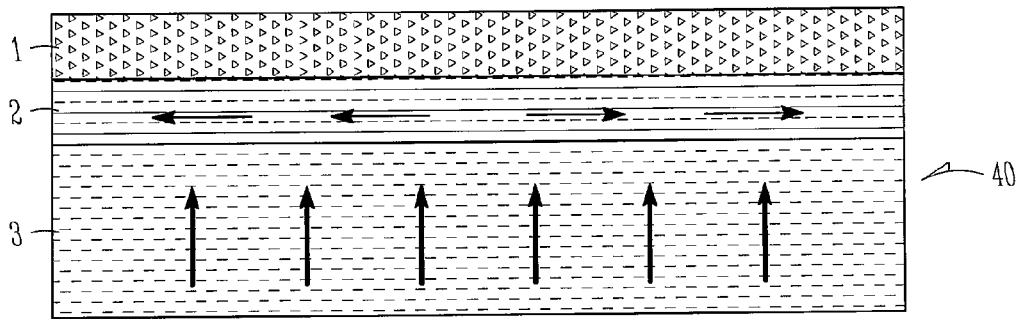
Figure 2B:
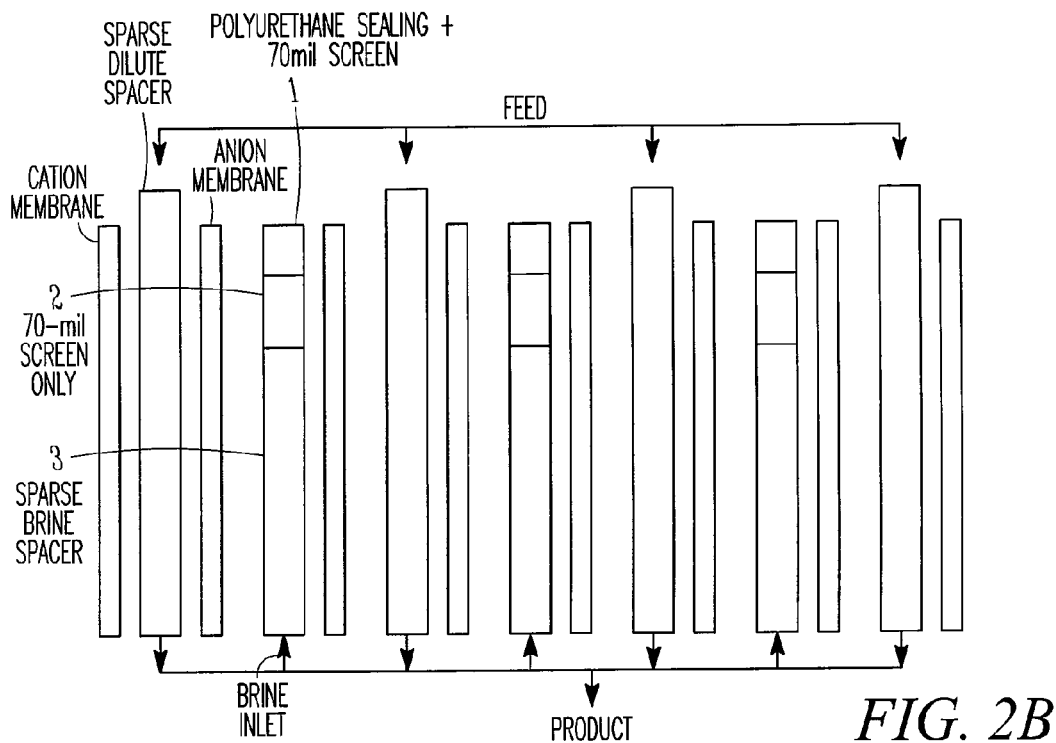
FIG. 2B is a vertical section taken parallel to the roll axis of a spiral EDI device made with the membrane envelope of FIG. 2A.

These elements of construction may be carried out to implement different flow paths. FIG. 2A illustrates one such arrangement, showing an (unfurled) leaf 40 having a pattern of sealing bands 1, unfilled mesh 2, and bead-filled mesh region 3 forming a half-sealed envelope that remains open along the bottom edge. The half-envelope is configured to receive an inlet flow at the bottom. The low impedance unfilled mesh region 2 extending along the top edge promotes a generally upward flow through the filled mesh 3, parallel to the axis of the device, as indicated by arrows in the figure. The filled mesh may, for example employ a 28 mil (0.7 mm) thick screen with a coating of 650 C cation exchange beads, to define brine cell regions 3 of suitable hydraulic resistance and good electrical conductivity, and a thicker unfilled screen (e.g. 70 mil) may be employed in region 2 to maintain membrane spacing while presenting lowered resistance that promotes the desired flow distribution. As indicated by arrows in FIG. 2A, the flow follows the pressure drop toward the unfilled spacer region 2, and then turns to proceed along an outflow path that branches, running horizontally along the top of the leaf to conduct the brine flow out both of the two ends (e.g., the inner and outer ends of the spiral when the envelope is rolled in an EDI device.) A short concentrate outlet conduit may be inserted into the outflow region 2 in the innermost and outermost turns of the roll to connect this flow to one or more vessel ports. FIG. 2B shows a vertical cross-section through several turns of the spiral wound assembly, omitting the electrodes, to illustrate relative directions of the feed and concentrate flow paths in the central treatment area of the device that occur with the leaf of FIG. 2A when the brine cell is fed at the bottom (e.g., with the product water as illustrated, or with a separate fluid connection of feed or conditioned brine). The feed water proceeds downward along the axis of the device, while on the other side of the membranes there is an axial flow upward from the concentrate inlet end which becomes a faster exit flow of the concentrate along the band 2 of unfilled mesh, which defines a spiral outflow path lying in a generally horizontal plane at the top of the device. In general, when fed from the feed or product flow in this manner, the concentrate flow need be only a small portion, e.g., 1%-10%, of the total flow, and such minor fraction may be automatically and passively diverted into the concentrate cells by using suitable mesh and filling parameters. The thin concentrate cells having some cation exchange beads retain, or quickly attain suitable conductivity even when fed with product water, and recovery is high. Apportionment or deflector elements or one or more valves (such as a product back-pressure valve and/or a brine inlet valve) may be positioned at the bottom of the unit if desired to set, or to control or adjust, the amount of flow diverted to or passed into the brine cells. Brine back pressure may alternatively be set at the brine outlet to control brine flow.

These arrangements of the concentrate path present advantageous operating characteristics. When using a single pass, rather than recirculating, brine fed into a filled cell, the product outlet end of the dilute may be highly polarized, resulting in very stable removal characteristics and robust ability to deal with upset or start-up conditions and changes in feed quality.

The leaf of FIG. 2A may alternatively be installed in an inverted orientation, with its seal band I positioned along the bottom or product out end of the unit. In that case, the concentrate cells may be fed in a similar manner by a bleed from the feed, and both the concentrate and dilute flows will proceed along the same (downward axial) direction during the initial portion of their path, with the concentrate flow turning to form a faster cross path near the exit end of the device.

Other path geometries are implemented in accordance with the invention by employing different leaf sealing patterns, several of which will be described later below with reference to FIGS. 5-7. These may include leaves with an at least partly open (inner or outer) end, and at least partly open sides to define paths running in segments along one or more spiral directions. The seals provide great latitude in setting path length, path direction, and such characteristics as flow impedance, pressure drop and dilute/brine pressure difference.

In accordance with another aspect of the invention, a membrane/spacer leaf is fitted in a device fabricated with one or more electrode assemblies that are implemented as a conductive electrode sheet winding parallel to the rolled leaf, and having more than a full turn of electrode surface such that a pocket is formed in an electrode overlap region. The electrode forms a one-turn volute or helix, and the leaf passes into the radially-open gap extending between the end of the electrode and the next turn. This construction positions the leaf flat and parallel against the electrode surface around its full circumference, and places the envelope end or termination in a field-free region, e.g., the interior of the electrode or pocket. The envelope/electrode geometry wherein the envelope remains substantially entirely parallel to a continuous cylindrical electrode contour, without abrupt turns or doubling of plies at the regions of attachment, and without projecting clamp structures, results in a more uniform field through the dilute and concentrate cells near the electrodes, free of the shadowing, inhomogeneities and shielding that arise from prior art arrangements of slotted openings, sheet clamping structures and the like. When applied to the concentrate cells, it permits passage of concentrate through the electrode and into a field-free region while maintaining substantial isolation from the feed-product flow path, and thus avoids the problems of brine short-circuiting or back-diffusion that may occur near the concentrate manifolds and electrolyte cells of prior art EDI devices.

Figure 3:
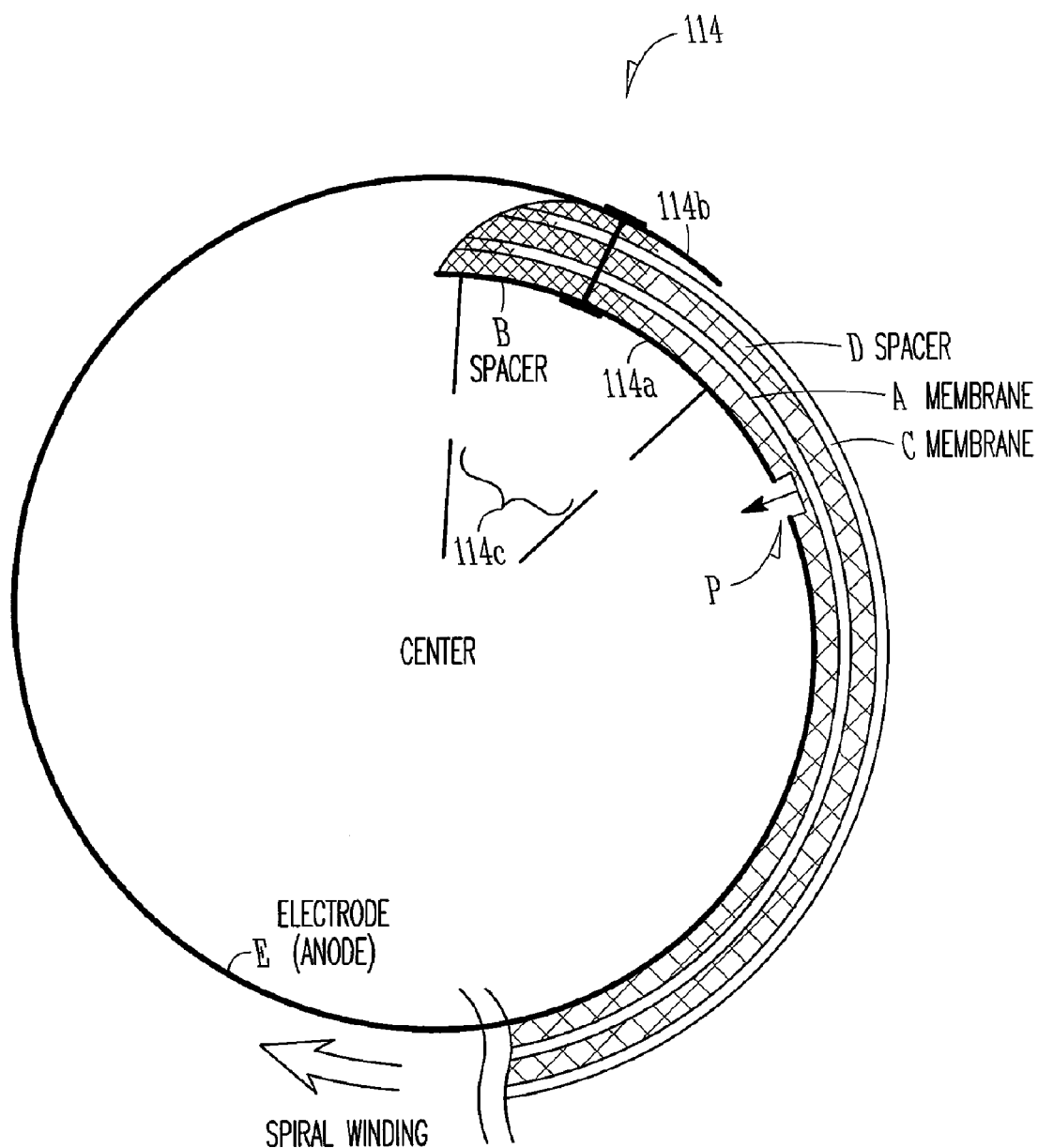
FIG. 3 illustrates an inner electrode construction of one prototype embodiment in accordance with one aspect of the invention.
Figure 4:
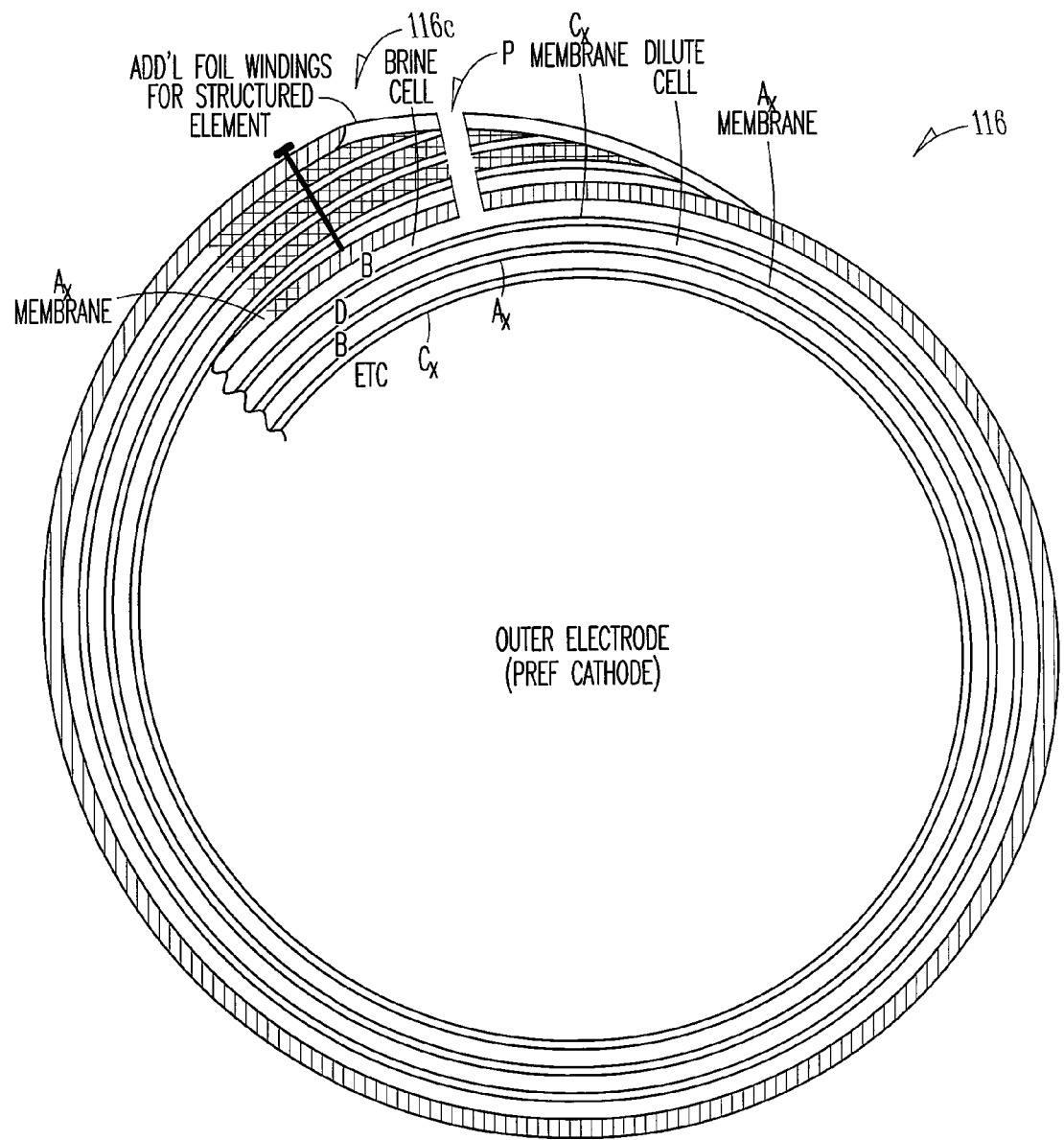
FIG. 4 illustrates an outer electrode construction of the prototype embodiment in accordance with this aspect of the invention.

FIG. 3 is a cross-sectional view of an inner electrode and spiral-wound leaf, taken in a plane normal to the winding axis, illustrating such an electrode pocket and termination of the membrane/cell structure, such as the spacer/leaf structure of FIGS. 1A-1D, at the electrode in one prototype spiral EDI device. FIG. 4 shows a corresponding view of an outer electrode structure for the prototype embodiment. Each electrode is preferably formed of sheet stock of a suitable conductive sheet material, such as stainless steel, titanium or platinum (e.g., platinum-painted or or with its surface otherwise platinized) or other inert or conductive metallic-surfaced sheet. Preferably a non-oxidizing material, such as a platinum-surfaced sheet is employed for the anode. Ancillary structures such as suitable current leads, electrical connector tabs and the like (not shown) may connect to the electrode and extend or electrically communicate through the vessel housing (FIG. 1), and the very end of a membrane, spacer or leaf may be affixed to the electrode surface by a cement, by one or more fastening clips, a screwed-down metal strip or the like (also not shown).

As shown in FIG. 3, according to this aspect of the invention, the central electrode 114 (corresponding to electrode 14 of FIG. 1) which in the prototype device is the anode, is comprised of a wound sheet of which the end regions 114a, 114b overlap in an angular sector 114c that extends for a few centimeters and in which the sealed ends of the leaf terminate. This overlap region forms an electrode pocket which receives the leaf end—membranes, dilute and brine spacers, and lies at a single potential, so that there is no electrical field in the pocket region. The pocket termination of the leaf, including spacers, may be sealed, for example with a curable polyurethane assuring that the dilute and brine fluids cannot leak out or intermingle. The individual spacer and membrane layers may terminate successively, or with slight offsets, as illustrated, to form a tapered-end insertion, rather than a butt-ended insert, where the electrode's outer edge overlaps the inner one. The electrode winding thus fits well against the angled surface in the pocket region and is fully supported. Thin foil or other metal sheet may be used to form the electrode surface. The spacer/membrane roll lies exactly parallel and flat against the outer surface of the central electrode as the spacer/leaf exits the pocket.

In this prototype construction, the winding structure comprises a repeating sequence of four layers, namely a brine spacer assembly B, an anion exchange membrane A, a dilute spacer assembly D and a cation exchange membrane C. In the construction of the illustrated prototype with a central anode, the brine spacer layer B extends for a length of one full circumference of the central electrode, beyond the end of the adjacent cation exchange membrane $C_x$. Thus, when the leaf is mounted in the pocket, the brine spacer B lies directly against the outer surface of the anode 114 for a full turn, and the adjacent dilute cell is bounded on the anode-facing side by an anion exchange membrane. The first winding or end length of the brine spacer path thus functions like the anolyte cell of a conventional EDI device. Preferably the anode, electrode 114, has one or more openings 114d therethrough placing the brine space in fluid communication, for example, with a port in the bottom flange as shown in FIG. 1, e.g., a brine port, permitting the concentrate fluid to pass through the inner electrode.

The brine concentrate spacer and anion exchange membrane are placed adjacent to the electrode, and wound and sealed with the remaining plies into the pocket at the region 114c, after which the leaf/spacer assembly is wound multiple times and then terminated at the outer electrode. The outer electrode structure, one example of which is illustrated in FIG. 4, preferably employs a similar construction as a winding with a pocket. After winding the outer electrode, screws or other fasteners may be placed through the overlapping electrode layers, or the circumference may be banded and clamped to seal the unit together. Thus one of the two electrodes conforms to the shape of the first turn of membrane/spacer assembly and the other one follows the shape of the last turn. In the case of the outer cathode assembly, termination may be effected by extending the brine spacer layer for a length of one full electrode circumference beyond the anion exchange membrane, so that the final brine spacer layer lies directly against the inside surface of the outer electrode (the cathode, as illustrated), and a cation membrane lies on the cathode side of the next adjacent dilute cell. All or a portion of an electrode may be made from metal screen, wire or conductive mesh, rather than from a sheet of conductive foil, or may include conductive mesh or wire on a support sheet, but conductive foil is preferred. Furthermore, the foil (for example, a two mil [0.05 mm] foil) may be wound several additional turns around the outside (when used to form the outer electrode as indicated schematically in FIG. 4) so as to constitute a containment vessel for the assembly, or may be initially wound for several turns at the inner electrode, before attachment of the leaf, so as to constitute a central pipe, making the corresponding structural portion of the housing element, vessel or support unnecessary. In this case, one or more ports P as shown in FIGS. 3 and 4 may be drilled through the electrode and fitted with suitable fittings to allow fluid communication through the electrode winding with the brine cells.

FIG. 4 is a cross-sectional view of the outer electrode 116 formed with a similar wound sheet and pocket structure overlapping in an angular sector 116c where the sealed ends of the leaf terminate. The envelope/spacer roll of the prototype is constructed so that here too, the brine spacer B lies adjacent the electrode surface, and communicates through a suitable port P. When the brine spacer is a spacer as shown in FIGS. 1A-1C, constrained between two membranes sealed at top and bottom, then the concentrate flow passes through the spiraling concentrate spacer layer B, and may pass directly through one or more of the electrodes. When the brine envelope of FIG. 2A is used, having one open edge for receiving the brine inlet, the both the inner and outer electrode ports may be brine outlets. However, in other embodiments, it may be preferable to have the brine enter at one end of the spiral, e.g., at the anode, which is preferably the inner (smaller) electrode, and proceed toward the cathode so that the brine stream is initially acidified by anolyte and better resists scaling. In still other embodiments, the brine layer need not lie immediately adjacent to the electrode, but instead separate electrode spacer cells (electrolyte cells) may be provided at one or both electrodes to allow a separate flow of fluid adjacent to one or both electrodes. This allows one or both electrolyte flows to be supplied, treated or conditioned separately from the bulk dilute and brine flows, in a manner analogous to electrolyte treatment of prior art EDI device constructions.

The foregoing examples illustrate several generally advantageous properties. Spiral EDI units of the invention employ a relatively small number of hardware and spacer components, and these are of low cost. The use of a sparse bead filling allows cells of small width to support high product flow velocities, and the roll sealing and assembly process allows path lengths to be readily defined and optimized to accommodate flows or apportion flows without causing occlusion or cross-contamination of cells. This also allows the EDI device to be easily assembled in a dry or non-swelled state, without membrane pre-treatment. Subsequent conversion (wetting and/or de-salting) then leads to expansion and enhanced sealing as well as enhanced membrane-bead contact and highly uniform electrical and ionic conductivity. Constructions with an envelope as shown in FIG. 2A that seals the brine cell on only a single top or bottom end of the envelope also allow the concentrate cells to be easily fed by a portion of the feed or product water internally of the vessel. Furthermore, the use of an inter-membrane pattern of multiple seal line segments to form bead-filled envelopes results in very efficient membrane utilization—up to 95% of the membrane area actively participates in electrodeionization, far more than in current flat plate EDI architectures—and provides great control over flow direction in both dilute and brine cells. The sparsely-filled mesh and unfilled mesh regions have low hydraulic resistance which may be exploited to define distribution or collection manifolds or determine flow direction and paths within the device that are substantially free of channeling.

The spacer structure, consisting of one or more layers of mesh (e.g., polymer screen) with exchange beads fixed in/on the screen efficiently determines the distance between membranes, providing both membrane support and a medium for ion capture and transport, and effectively prevents migration or loss of the resin. Moreover, in localized regions (e.g., adjacent to a port or at the ends of the flow) a screen may be used with a smaller mesh sized to also serve as a bead trap, or with unfilled regions or a larger overall thickness intended to serve as a flow distributor or flow collector. Ion exchange felt or suitable (e.g., polypropylene) cotton may also be applied near edges or at ends of the containment vessel to assure that the beads are retained in the unit, or in active treatment areas.

Thin constructions of a spacer with exchange beads, or a defined pattern and distribution of bead types, are readily formed by attaching the beads to the screen with adhesive, and specialized spacer assemblies may be so formed before final rolling and assembly of the device. The screen dimensions may be selected so the gap between any strand and one of two neighboring membranes is smaller than bead size, preventing the beads from moving around or clumping, and thus assuring effective flow a effective exchange or conductivity characteristics. Spacing of the adjacent membranes in a roll may also be achieved by employing a "bumpy" membrane, i.e, a membrane formed with bumps or other features protruding above the nominal surface plane; raised portions of the surface then contact opposite membrane. In this case, a screen or mesh is not necessarily required to determine the inter-membrane spacing or the exchange particle distribution, and may be omitted in some embodiments. It should be noted, however, that in the past, it has proven difficult to manufacture exchange membranes with surface projections, and applicant does not believe that any bumpy exchange membranes are now available commercially. An alternative, however, is to attach scattered ion exchange beads to the surface of at least one of the ion exchange membranes using, for example, a non-insulating fixation compound, such as a soluble glue. The beads, once assembled contact the opposite membrane (which may be similarly prepared) to determine the membrane spacing, cell conductivity and/or ionic conductivity. The assembly may be hydrated and swelled after assembly, which flushes the glue from the assembly, further enhances membrane-bead contact, and prevents the beads from shifting position. In dilute cells, preferably ion exchange material placed between membranes by any of these methods is positioned so that the anion exchange mass contacts the anion exchange membrane on the anode side, and the cation exchange mass contacts the cation exchange membrane on the cathode side. Because the quantity or distribution of exchange beads remains limited, swelling will be small and manageable in the device as a whole and should not impair either the structural properties or the flow properties of the device. The units may be rolled and assembled "dry" or using a non-water solvent different from the solvent intended during normal operation. The solvent may then be substituted/removed after assembly, and the expansion of ion exchange material and membranes resulting from this conversion will assure good contact between components.

Homogeneous anion and cation exchange membranes such as those made by Ionics, Incorporated of Watertown, Massachusetts were employed in construction of several prototypes. These are preferred because of their strength, relatively low swelling and limited transmembrane water leakage. Heterogeneous membranes may also be used, but in the latter case it is preferable that at least some degree of pre-swelling or membrane hydration be effected before assembly, and steps such as web tensioning during a leaf rolling or assembly may require closer control due to the lesser strength, greater swelling and general looseness and flacidity of heterogeneous membrane.

As noted above, the described constructions provide a flexible approach toward defining different fluid flow paths within the spiral EDI device by suitable patterning of the sealing bands and manifold regions of an envelope. FIG. 5 illustrates one embodiment of a two-membrane envelope for defining spiral EDI flow cells, wherein the brine flow is fed at one end of the cylindrical housing, between the center and the outside of the spiral, and branches to flow inwardly and outwardly within the spiral brine flow space. Each branch turns at the respective inner/outer end of a blocking seal $1a$ to reverse its direction along the spiral, and reverses once more as it passes through the central opening between two further flow deflectors $1b$, $1c$. The distal ends of the bifurcated flow paths then pass out through openings at the inner and outer edges of the roll, having followed two generally spiraling paths of length somewhat greater than the length of the winding itself.

Figure 6:
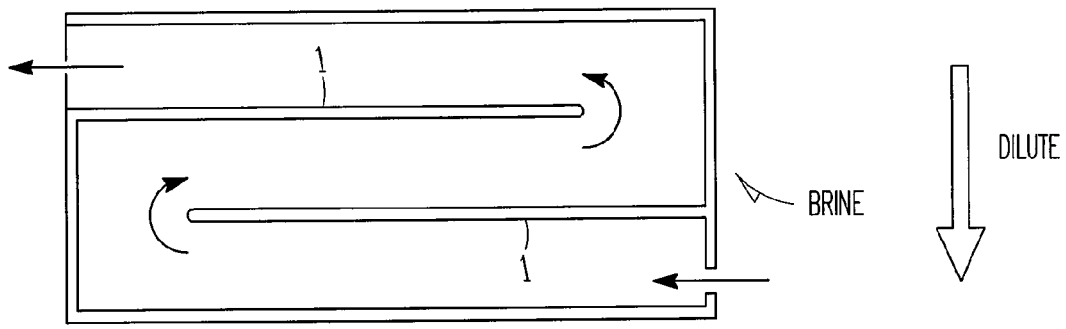

FIG. 6 illustrates another path configuration defined by envelope seal lines 1. In this embodiment, the brine enters at the lower right corner, is constrained along two "race track" turns to travel approximately three times the spiral length, and exits at the upper left corner. "Lower right" and "Upper left" refer to the positions in the unrolled membrane, but will correspond to positions at the inside (center) and at the outside (periphery) at opposite ends when the envelope is rolled in the device. Entry or exit may be effected by any means discussed above—e.g., a conduit passing into the cell, an opening through a bounding electrode or other construction.

Figure 5:
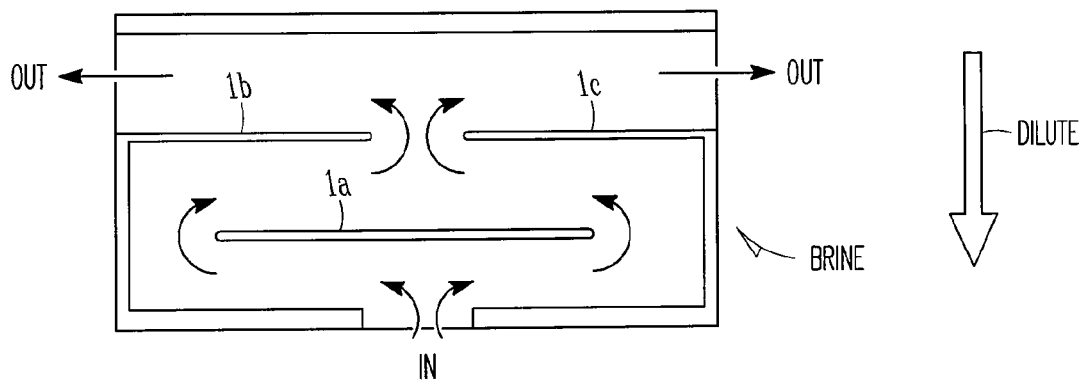
FIGS. 5, 6, 7 and 7A are plan views of additional embodiments of exchange membrane envelopes and associated details for other embodiments of a spiral EDI device as illustrated in FIG. 1.
Figure 7:
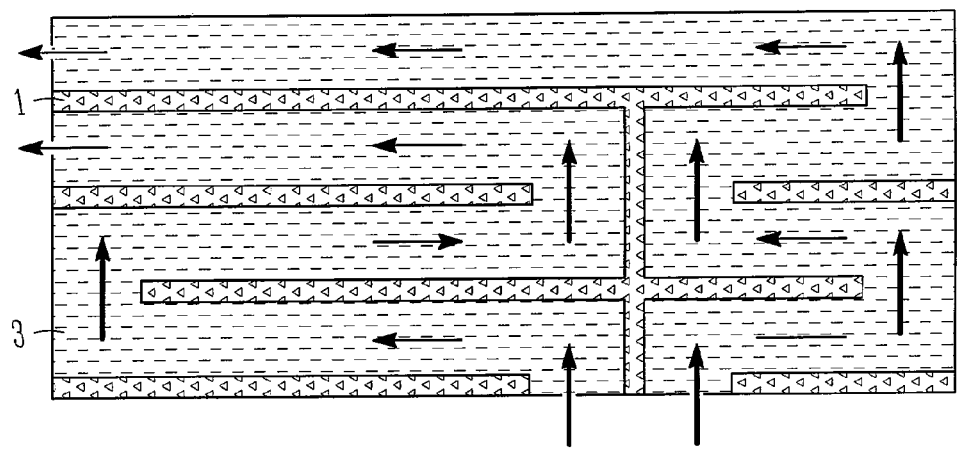

FIG. 7 illustrates another configuration, similar to that of FIG. 5 but employing separate inlets for the two brine flow branches that are maintained separate while arranging the barrier seals 1 so that the two flow paths are of different lengths.

Figure 7A:
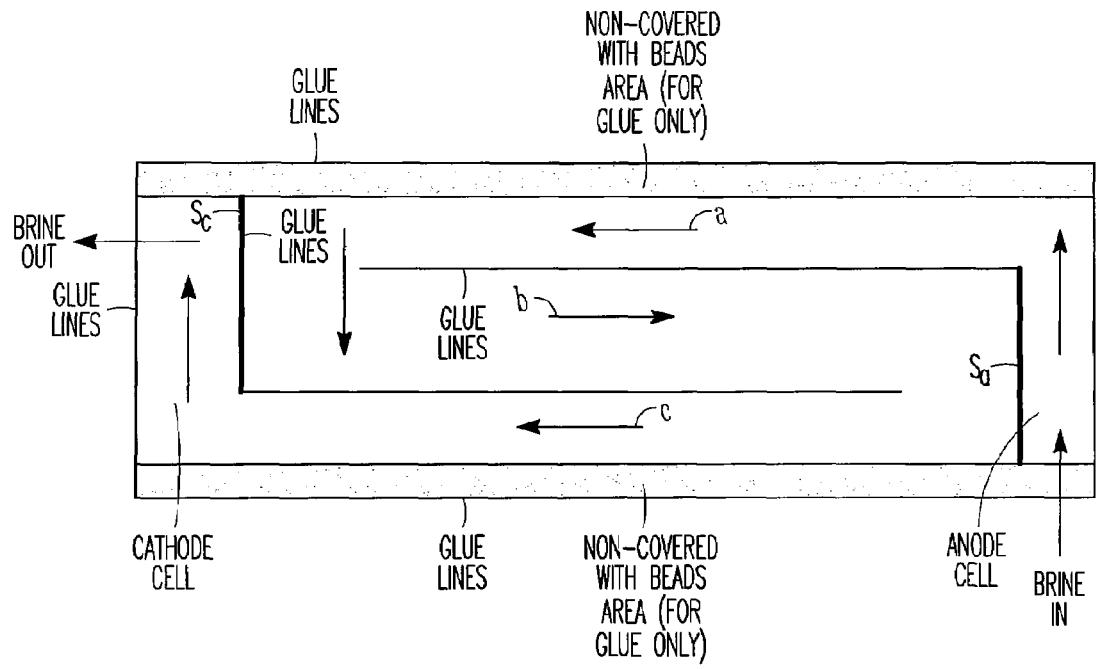

The seals may further define flow paths that are restricted to the region of the electrodes, for example by a seal line extend parallel to the winding axis at the edge of the electrode region—that is a distance one electrode circumference inward from the leaf end. FIG. 7A illustrates such an embodiment, showing the glue/sealant bands (dark lines and flow paths through a brine cell wherein the right-hand end corresponds to the anode or anode cell, and the left-hand end to the cathode or cathode cell. As shown, the brine inlet flow $b_i$ enters at the bottom of the anode cell and is constrained to flow axially along the length of the anode by seal line $s_a$ becoming acidic. The acidified brine then turns along successive helical path segments a, b, c before entering the cathode area of the brine or catholyte cell, where seal line $s_c$ retains the flow in the cathode or cathode cell. The dilute spacer covers only the area between the anode and cathode area seal lines $s_a$ and $s_c$ away from the highly concentrated electrolyte area (see FIGS. 3 and 4), thus limiting effects such as back diffusion. Moreover, the initially acidified brine guards against the occurrence of excessively high pH conditions in the brine cell or at the brine side of the anion exchange membrane that might otherwise contribute or induce susceptibility to scaling.

In addition to seals defining brine cell flow paths, devices of the invention may employ seals to restrict or delimit the dilute flow paths, so that the spiral wound device effectively operates with the dilute flowing in a longer path or in series through two or more cells, becomes a two-stage device, or becomes a two stage device with different brine flows or path configurations for each stage.

Another important aspect of construction that may be employed in dilute cells of an EDI device of the present invention is to employ a screen mesh within the sparsely-filled dilute cell wherein the screen both segregates the different types of exchange beads, and deflects flow to assure adequate contact between the dilute flow and both types of beads. One construction, which the inventors refer to as s-layering, is illustrated in FIG. 8, in a schematic view, taken normal to the tangent plane of the dilute cell and along a line extending in the nominal flow direction. As shown in FIG. 8, a dilute cell is defined between an anion exchange membrane $A_x$ and a cation exchange membrane $C_x$ such that cation exchange material C lies adjacent to the membrane $C_x$ and anion exchange material lies adjacent to the membrane $A_x$. This may be accomplished as described above by selectively coating opposite sides of an adhesive-coated screen S with the different types of exchange beads to form a dilute cell spacer assembly. The s-layering construction according to this aspect of the invention is further characterized by a plurality of one-sided obstructions or flow deflectors $D_c$ (positioned on the cation side to deflect flow toward the anion side) and $D_a$ (positioned on the anion side to deflect flow toward the cation side) which are alternately placed across the general direction of flow to divert the flow to the opposite side of the dilute cell. The flow deflectors may be part of the screen itself, such as filaments of greater height or cross-section running across the flow direction and projecting on alternate sides of the screen by an amount that obstructs flow across a substantial portion of one side. Alternately, the deflectors may be separately formed or placed, for example as filaments or lines of sealant laid down at the indicated positions to deflect flow from alternate halves of the channel. The screen or spacer construction may also be effected using more than one layer of screen, or may be effected by using screen or mesh formed of the corresponding ion exchange materials, in which case exchange beads may be omitted. This aspect of the invention is advantageously employed in flat plate EDI devices of thin cell construction and is not limited to use in EDI devices of rolled-leaf or spiral construction.

Various spiral EDI devices may be configured with membranes and spacers according to one or more of the above specific types. One particularly advantageous construction is achieved in accordance wit the present invention by providing a brine cell spacer having segregation bands that extend across the general direction of the dilute flow (which may be axial), and which operate to isolate the species entering the concentrate cell near the front of the dilute path from the species entering the concentrate cell further along the dilute path. This aspect is illustrated in FIG. 9A.

Figures 9A, 9B:
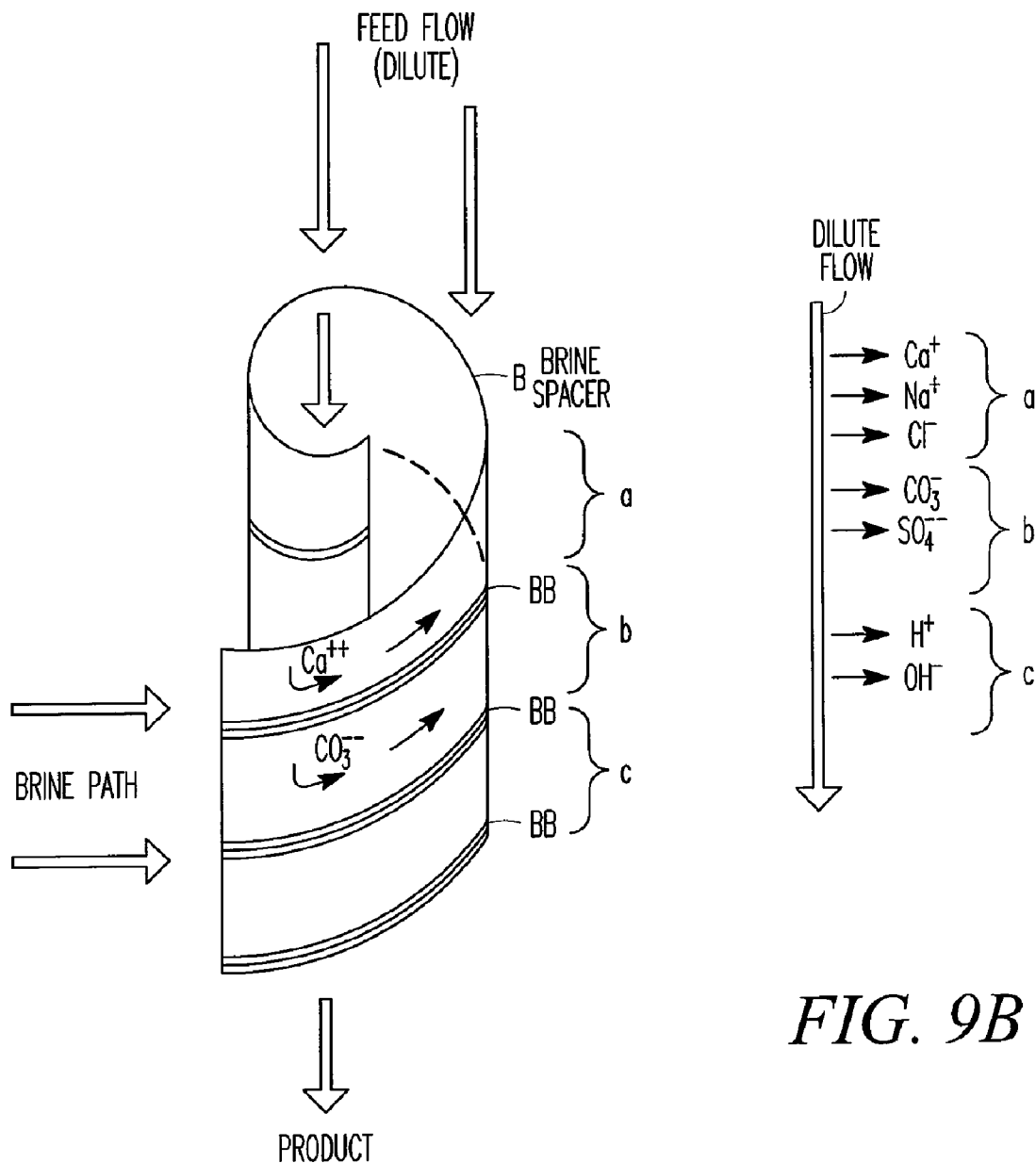
FIGS. 9A-B illustrates details of a flow port construction for practice of embodiments of the invention.

As shown in FIG. 9A, a brine spacer, denoted generically B has one or more bands BB that extend at least the full thickness of the spacer to contact the adjacent membranes and constrain the concentrate flow within a horizontal (as shown) region which corresponds to an initial or subsequent segment of the dilute flow path. Three such bands BB are shown, corresponding to different characteristic regions of demineralization along the dilute path as schematically illustrated in FIG. 9B. While certain species may be absent or of negligible effect in many feed fluids, these regions illustratively include a first region a of the dilute path wherein cations in the dilute flow such as certain bivalent metal ions like calcium or magnesium enter the concentrate cell; a second region b where monovalent ions and larger or less mobile higher valence ions such as CO3, sulfate and the like pass from the dilute flow, and a third band c located toward the product outlet where the device may operate in a more polarized mode with substantial generation of hydroxyl and hydronium ions and their passage into the concentrate cell. The bands BB separate these regions of the concentrate cell into distinct and separate flow strips, so that flow of each species or group of species proceeds along a separate path toward the concentrate outlet or outlets. In this manner, the various complementary components that might otherwise give rise to scale are prevented from meeting. Certain species, such as the neutral gas $CO2$, which may pass through the membranes relatively freely, back-diffuse into the dilute stream and re-enter the concentrate cell, may enter all the concentrate regions a, b, c, but at each location the absence of a component segregated elsewhere would render this combination essentially non-scaling.

The segregation bands BB may be implemented by several alternative means. One approach is to deposit a band of impermeable sealant along a strip to fill the brine screen spacer and prevent fluid movement across the band. Another approach is to employ, as a spacer, an asymmetric screen wherein the larger-dimension strands of a network extend continuously and parallel to each other for the full thickness of the spacer, while smaller-dimension cross strands permit flow to proceed parallel to the large strands. In this case, the screen spacing may be relatively small, with a mesh of 0.5 to 5 centimeters, so that the major strands would create dozens or hundreds of segregated concentrate flow paths along a one-meter long dilute flow path, rather than the three general regions illustrated in FIGS. 9A-B. For prevention of scaling, it is important that the bands be sufficiently distinct in composition that the presence of complementary scale forming species does not come about under pH conditions that would cause them to deposit. This function can be achieved by a few bands BB, or by the tens or hundreds of bands provided by orienting the strands of an asymmetric screen along the direction transverse to the dilute flow.

Figure 10:
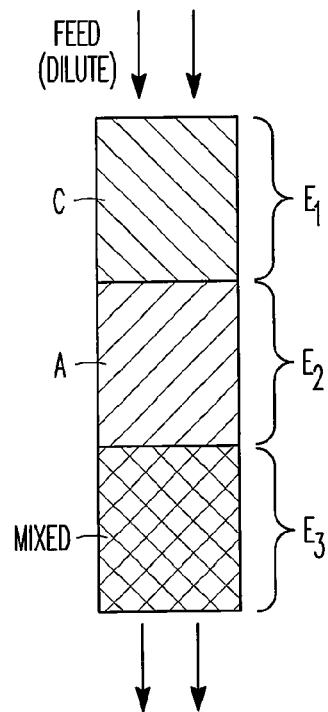
FIG. 10 illustrate flow profiling of the invention with the ports of FIGS. 9A-B.

The spatial separation of the relevant species may be enhanced or more precisely defined according to another or further aspect of the present invention, by arranging selected exchange resins in regions along the dilute path so as to selectively strip one type of ion in that region, or inhibit the passage of a complementary ion into the concentrate, thus more quickly and clearly separating the scaling or other components. FIG. 10 illustrates this aspect of the invention, showing schematically a dilute cell of a rolled EDI device (or of three devices arranged for serial flow. As shown, the initial region of the path, corresponding to region a is filled with a cation exchange resin C to more completely capture and transport the scale-forming metal cations into the upper concentrate band, while more effectively discriminating against certain potentially deleterious co- or counter-ions. A subsequent portion of the dilute cell has a filling of anion exchange material A to sharpen the removal of the bulky or hindered sulfate ions and other components, while a third region or stage contains a conventional mixed filling of exchange material for better polishing. Three separately-energized electrodes E1, E2, E3 may be employed to adjust or control operation more closely for the specific distribution of material present in the feed.

As noted above, embodiments of the invention address certain intrinsic inhomogeneities of prior art constructs by features such as a shielded electrode pocket for envelope termination, arranging the windings to avoid shadowing effects, and employing a relatively large core to limit the increase in current density that occurs at inner cells of the winding. In accordance with another aspect of the invention, the spiral is equipped with an end port structure that provides a compensatory flow profile.

Figure 11A:
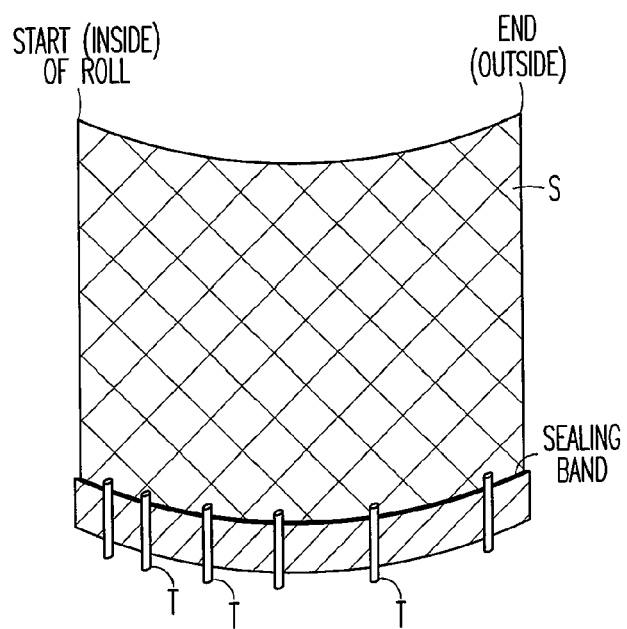
FIGS. 11A-B illustrate concentrate segregation with banded spiral filling according to another aspect of the invention.
Figure 11B:
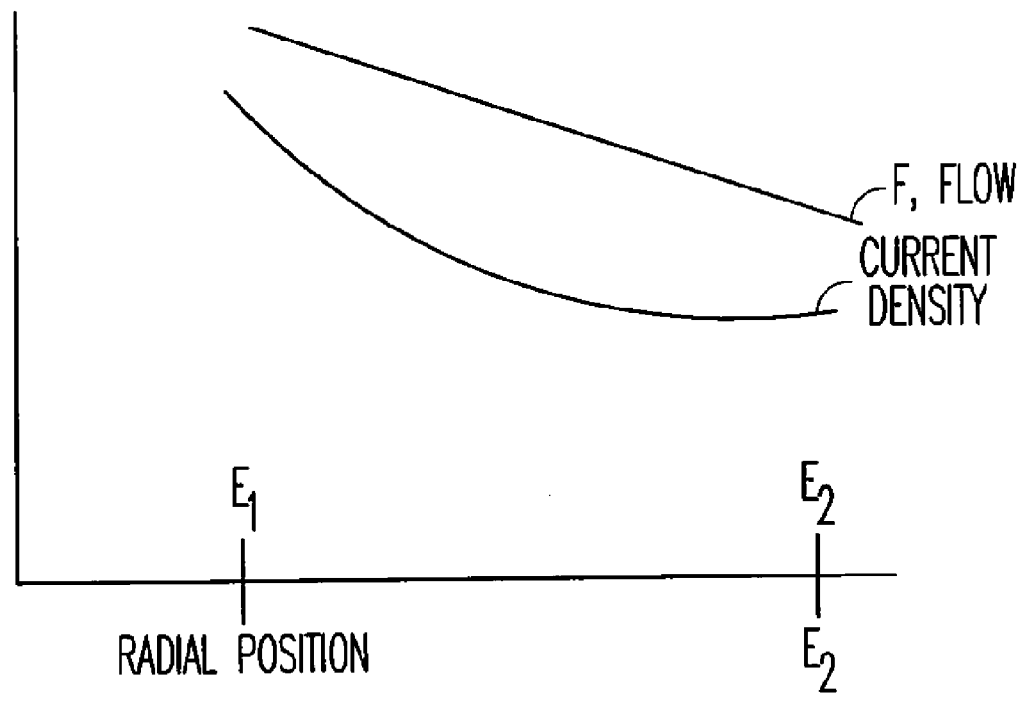

FIGS. 11A and 11B illustrate this aspect of the invention. A spacer S, which illustratively is a relatively large-strand mesh as described in Applicant's international application WO03/043721, is slotted to receive a plurality of tubes or rods T along one edge, and the screen and tubes are embedded in a fill-width sealing band. The band may be formed of a polyurethane or epoxy material which cures and provides sufficient flexibility to allow the screen to be rolled together with the exchange membrane and another spacer as described above, into a rolled EDI assembly. The end of the rolled assembly is preferably then potted, in a manner similar to that employed for forming hollow-fiber MF modules, so that all the membranes and spacers are sealed at the bottom (as shown) edge and the concentrate cells are well isolated from the dilute cells. The rods/tubes T project through the potting material. If rods rather than tubes are used, these may then be pulled from the assembly leaving through-holes communicating with the mesh S, which, like the tubes, operate as end-ports into the cells defined by the spacer S. As further shown in FIG. 11A, the elements T are spaced at progressively greater intervals toward one end of the spacer S. this results in a greater number of ports, hence increased flow at one end region of the spacer, which is preferably the inside (smaller diameter) portion of the rolled assembly.

FIG. 11B schematically illustrates this effect. The greater number of inlet or outlet ports allows more flow, or higher flow velocity at the radially inner portion of the spiral, the region that also experiences a higher current density. The fluid flowing in that region thus has a shorter residence time, yet may be treated to the same end point (for example, 15-16 MegOhm conductivity, as the fluid passing through the outer windings, without causing excessive depletion and polarized operation. The result is a high throughput, uniform quality product, free of extreme or inefficient operating regions.

The devices described above thus embody a number of novel, inventive and advantageous constructions for EDI devices that enhance the ease of manufacture, effectiveness of operation and overall performance or capabilities of the devices so constructed. In the foregoing description of illustrative embodiments, various novel elements and salient features have been emphasized, but these may be varied or supplemented with variations of overall architecture and other details of construction known from the technical literature of flat plate and spiral EDI devices, many of which are now on the market. Ancillary details relating to aspects such as bead catchers, ports, valves and electrode constructions as well as operating control are well known to those skilled in the art, and may be applied with suitable modification to the constructions described herein. The invention being thus disclosed, further variations and modifications will occur to those skilled in the art, and all such variations and modifications are considered to be within the scope of the invention as described herein and defined by the claims appended hereto.

The invention claimed is:

1. An electrodeionization device comprising a generally cylindrical housing including
   a) a cylindrical inner core
   b) an inner electrode extending around the inner core
   c) a leaf arranged as a spiral winding about the inner electrode, wherein the leaf includes an anion exchange membrane sheet, a cation exchange membrane sheet and a spacer sheet between the anion exchange membrane sheet and the cation exchange membrane sheet; and
   d) an outer electrode extending about the spiral winding, wherein active treatment cells are defined by spaces within said spiral winding and by interleaf spaces thereof, wherein sealing bands secure the top edges of the anion exchange membrane sheet, cation exchange membrane sheet and spacer sheet together to define fluid flow, wherein sealing bands secure the bottom edges of the anion exchange membrane sheet, cation exchange membrane sheet and spacer sheet together to define fluid flow, and wherein sealing bands secure the portions of the anion exchange membrane sheet, cation exchange membrane sheet and spacer sheet together at locations between the top and bottom edges such that the fluid flow enters either the top or bottom of the spiral winding and exits from the other of the top or bottom of the spiral winding.

2. The electrodeionization device of claim 1, wherein some of said sealing bands are arranged transverse to a flow of fluid that is to be demineralized, and are positioned and oriented to receive and maintain different scale-forming components in separate concentrate cell channels within the spacer sheet.

3. The electrodeionization device of claim 1, wherein the sealing bands effect one or more functions selected from the group consisting of the function of
   a) defining flow paths of a length longer than the leaf;
   b) defining a brine cell as an electrolyte cell isolated from dilute cells;
   c) defining a brine path orientation relative to a dilute path;
   d) defining brine flow such that the brine is acidified to resist scaling;
   e) defining a two-stage spiral EDI treatment device;
   f) defining pressure drops to induce flow in a desired direction;
   g) defining brine cell inlet and/or outlet port positions; and
   h) defining brine path impedance that enables brine feed by a passive internal bleed from a feed or product flow of dilute cells.

4. An electrodeionization device comprising a generally cylindrical housing including
   a) an inner electrode extending around an inner core;
   b) at least one leaf containing two spaced-apart membranes and arranged as a spiral winding about the inner electrode;
   c) an outer electrode extending about the spiral winding; and
   d) a plurality of seals applied in contact with said membranes in a pattern within said leaf and/or an interleaf space of said spiral winding, at least one of the plurality of seals being between top and bottom edges of the said membranes, the seals being oriented transverse to the fluid flow within the spiral winding.

5. The electrodeionization device of claim 4, wherein
   a) said inner electrode is an anode;
   b) the device is arranged to acidify brine flow; and
   c) the membrane/spacer leaf defines sparsely filled dilute and/or concentrate paths.

6. An electrodeionization device that includes a generally cylindrical housing, the electrodeionization device comprising:
   a radially inner electrode arranged in a generally cylindrical shape along an axis;
   a plurality of spacers and selectively permeable membranes arranged in a spiral winding about the inner electrode; and
   a radially outer electrode extending about the spiral winding, wherein dilute and concentrate cells are defined by spaces within said spiral winding in a region between the radially inner and the radially outer electrodes, and wherein an impermeable separator band is located between top and bottom edges of the spiral winding to define multiple concentrate flow paths, the impermeable separator band being within the concentrate cells to separate different scale-forming components which are removed from fluid in the dilute cells and to direct the components along different concentrate flow paths thereby avoiding or providing enhanced resistance to scaling.

7. The electrodeionization device of claim 6, wherein the separator band include one or more elements selected from among strands of a screen or mesh spacer and bands of a sealant extending between membranes 8. The electrodeionization device of claim 6, further comprising ion exchange filling in the dilute cells arranged to selectively enhance transport of said separate components into said different concentrate flow paths.

* * * * *

UNITED STATES PATENT AND TRADEMARK OFFICE
CERTIFICATE OF CORRECTION

PATENT NO. : 7,591,933 B2 Page 1 of 1
APPLICATION NO. : 11/291526
DATED : September 22, 2009
INVENTOR(S) : Grebenyuk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 489 days.

Signed and Sealed this

Twenty-first Day of September, 2010

David J. Kappos
*Director of the United States Patent and Trademark Office*